(12) United States Patent
Clune et al.

(10) Patent No.: US 7,406,810 B2
(45) Date of Patent: Aug. 5, 2008

(54) RECLOSABLE PACKAGING

(75) Inventors: William P. Clune, Northwood, NH (US); William H. Shepard, Amherst, NH (US); George A. Provost, Litchfield, NH (US)

(73) Assignee: Velcro Industries B.V., Curacao ( * ) Notice: Subject to any disclaimer, the term of this patent is extended or adjusted under 35 U.S.C. 154(b) by 414 days.

(21) Appl. No.: 11/257,347

(22) Filed: Oct. 24, 2005

(65) Prior Publication Data

US 2006/0062496 A1 Mar. 23, 2006

Related U.S. Application Data

(63) Continuation of application No. 10/357,608, filed on Feb. 4, 2003, now Pat. No. 6,991,375, which is a continuation-in-part of application No. PCT/US99/26261, filed on Nov. 5, 1999, which is a continuation-in-part of application No. 09/187,389, filed on Nov. 6, 1998, now Pat. No. 6,202,260.

(60) Provisional application No. 60/159,489, filed on Oct. 14, 1999, provisional application No. 60/228,819, filed on Apr. 16, 1999.

(51) Int. Cl.
*B65B 61/18* (2006.01)
*B31B 1/90* (2006.01)
*B65B 9/00* (2006.01)

(52) U.S. Cl. .................. 53/412; 53/133.4; 53/139.2; 53/450; 53/451; 493/212; 493/927

(58) Field of Classification Search .............. 53/412, 53/450, 451, 133.4, 139.2, 545, 550, 551; 383/81, 203; 24/449, 450; 493/213, 38, 493/393, 927
See application file for complete search history.

(56) References Cited

U.S. PATENT DOCUMENTS

| | | | |
|---|---|---|---|
| 3,372,438 A | 3/1968 | Rinecker |
| 3,417,440 A | 12/1968 | Billarant |
| 3,446,420 A | 5/1969 | Rinecker |
| 3,464,094 A | 9/1969 | Mates |
| 3,557,853 A | 1/1971 | Jones |
| 3,594,865 A | 7/1971 | Erb |
| 3,655,118 A | 4/1972 | Rinecker |
| 3,696,472 A | 10/1972 | Perina et al. |
| 3,727,829 A | 4/1973 | Huni |
| 3,780,781 A | 12/1973 | Uramoto |
| 3,807,626 A | 4/1974 | Goodrich |
| 4,241,865 A | 12/1980 | Ferrell |
| 4,337,889 A | 7/1982 | Moertel |
| 4,567,987 A | 2/1986 | Lepisto et al. |
| 4,580,683 A | 4/1986 | Gouchenour |
| 4,620,320 A | 10/1986 | Sullivan |
| 4,637,063 A | 1/1987 | Sullivan et al. |
| 4,672,722 A | 6/1987 | Malamen |
| 4,706,297 A | 11/1987 | Ausnit |

(Continued)

*Primary Examiner*—Louis K Huynh
(74) *Attorney, Agent, or Firm*—Fish & Richardson P.C.

(57) ABSTRACT

A method of fabricating reclosable bags comprising: disposing a releasably engaged closure between a first and a second bag film portions, the closure including a loop-engageable fastener strip comprising an array of loop-engageable fastener elements integrally molded with a sheet-form resin substrate, and a loop strip comprising a plurality of loops carried on a sheet-form resin base; and applying energy to bond the resin substrate of the loop-engageable fastener strip to the first bag film portion and to bond the resin base of the loop strip to the second bag film portion; wherein the loop-engageable fastener strip is not bonded to the loop strip when the energy is applied.

26 Claims, 33 Drawing Sheets

U.S. PATENT DOCUMENTS

| | | | |
|---|---|---|---|
| 4,761,318 A | 8/1988 | Ott et al. |
| 4,794,028 A | 12/1988 | Fischer |
| 4,812,074 A | 3/1989 | Ausnit |
| 4,824,261 A | 4/1989 | Provost |
| 4,955,981 A | 9/1990 | Provost |
| 4,967,451 A | 11/1990 | Boyn |
| 5,024,537 A | 6/1991 | Tilman |
| 5,032,122 A | 7/1991 | Scripps |
| 5,088,164 A | 2/1992 | Wilson et al. |
| 5,113,555 A | 5/1992 | Wilson et al. |
| 5,116,140 A | 5/1992 | Hirashima |
| 5,172,980 A | 12/1992 | Provost |
| 5,215,380 A | 6/1993 | Custer et al. |
| 5,260,015 A | 11/1993 | Kennedy et al. |
| 5,315,740 A | 5/1994 | Provost |
| 5,354,591 A | 10/1994 | Ott et al. |
| 5,360,270 A | 11/1994 | Appeldorn et al. |
| 5,369,847 A | 12/1994 | Naya et al. |
| 5,369,853 A | 12/1994 | Okawa et al. |
| 5,413,568 A | 5/1995 | Roach et al. |
| 5,461,845 A | 10/1995 | Yeager |
| 5,601,368 A | 2/1997 | Bodolay et al. |
| 5,611,791 A | 3/1997 | Gorman et al. |
| 5,620,769 A | 4/1997 | Wessels et al. |
| 5,669,120 A | 9/1997 | Wessels et al. |
| 5,699,593 A | 12/1997 | Jackson |
| 5,745,961 A | 5/1998 | Okawa et al. |
| 5,763,041 A | 6/1998 | Leak et al. |
| 5,773,120 A | 6/1998 | Deka et al. |
| 5,857,245 A | 1/1999 | Sakakibara et al. |
| 5,873,456 A | 2/1999 | Hull et al. |
| 5,887,320 A | 3/1999 | Provost |
| 5,964,399 A | 10/1999 | Ruben |
| 5,985,407 A | 11/1999 | Murasaki |
| 6,060,146 A | 5/2000 | Akeno et al. |
| 6,202,260 B1 | 3/2001 | Clune et al. |
| 6,367,128 B1 | 4/2002 | Galkiewicz et al. |
| 6,656,403 B1 | 12/2003 | Clune et al. |
| 6,991,375 B2 * | 1/2006 | Clune et al. .................. 383/203 |
| 7,163,706 B2 * | 1/2007 | Shepard et al. ............. 426/118 |
| 7,308,783 B2 * | 12/2007 | Shepard et al. ............. 53/133.4 |
| 2004/0001927 A1 * | 1/2004 | Moran et al. ............... 428/34.1 |

* cited by examiner

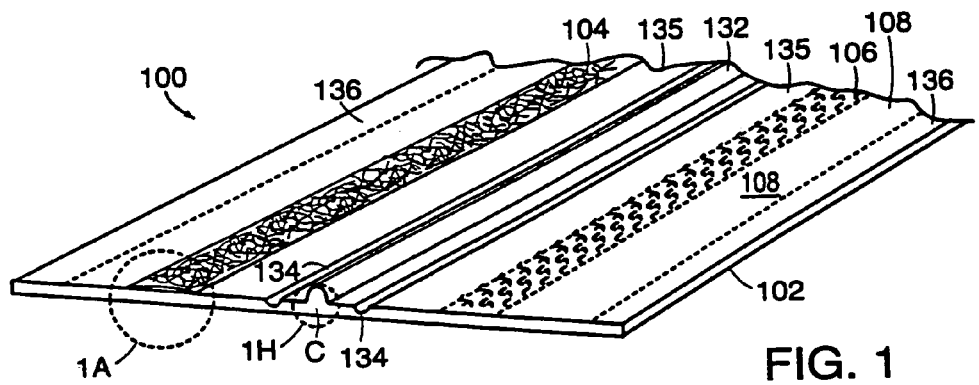
FIG. 1
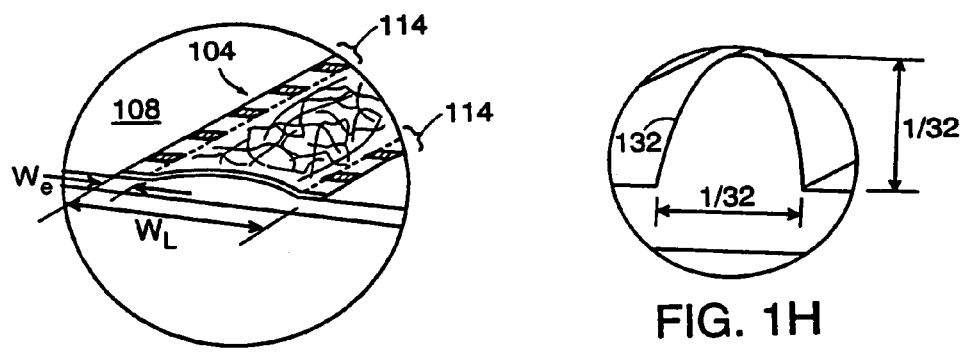
FIG. 1A
FIG. 1H
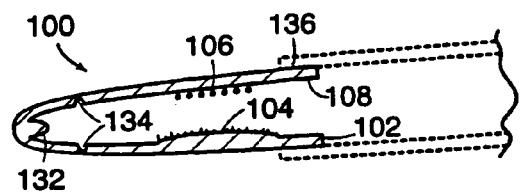
FIG. 3

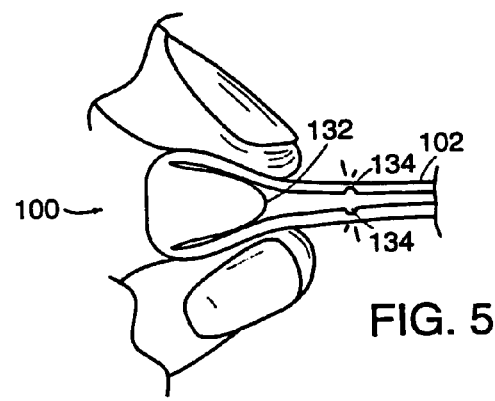
FIG. 5
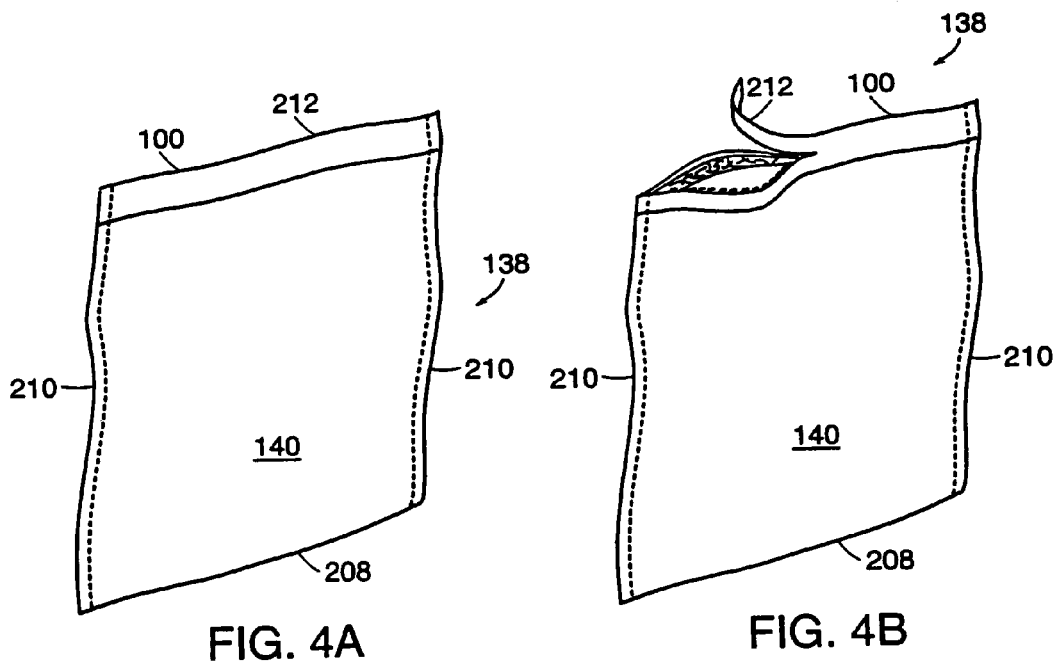
FIG. 4A
FIG. 4B

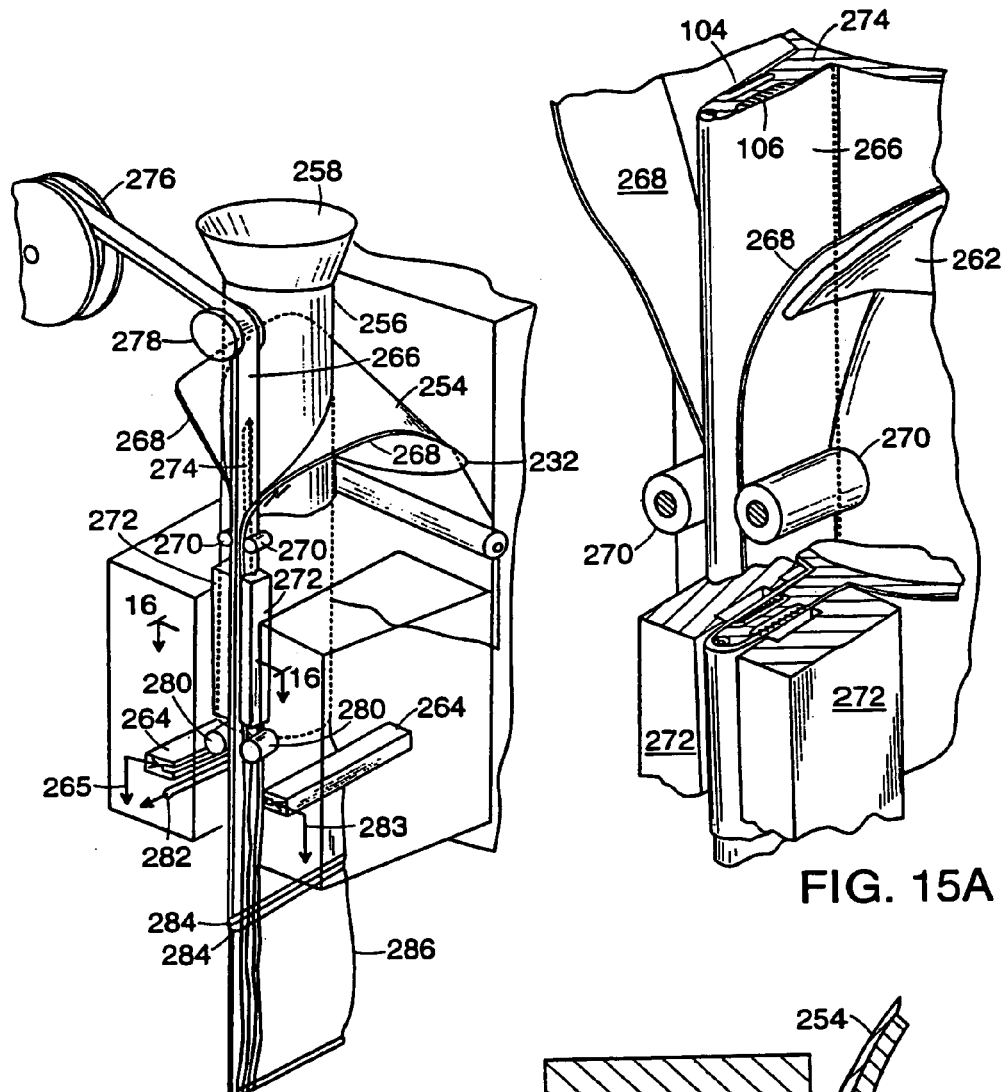
FIG. 15
FIG. 15A
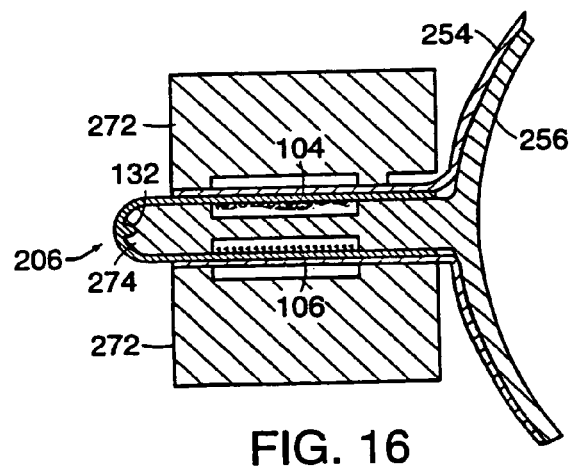
FIG. 16

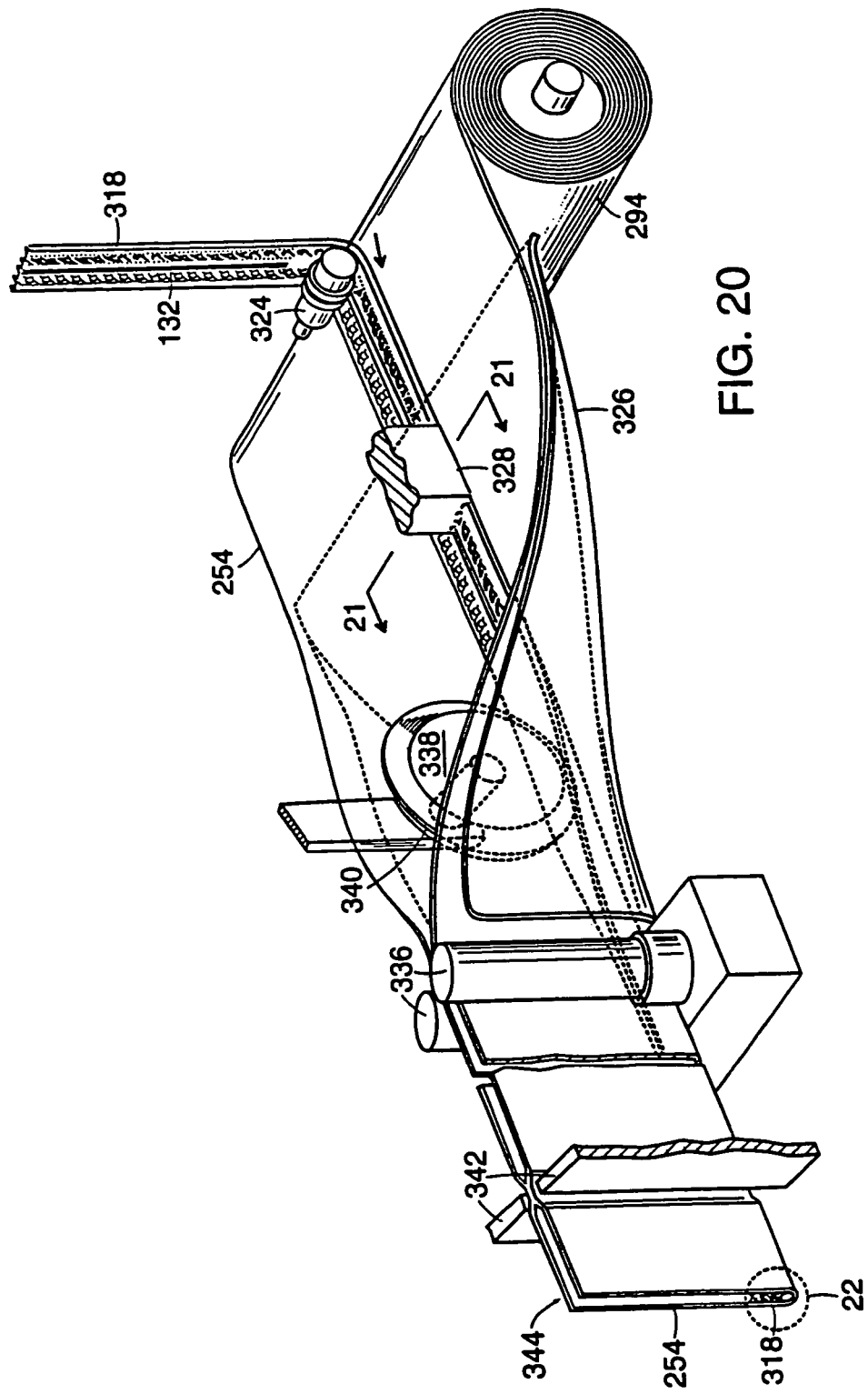

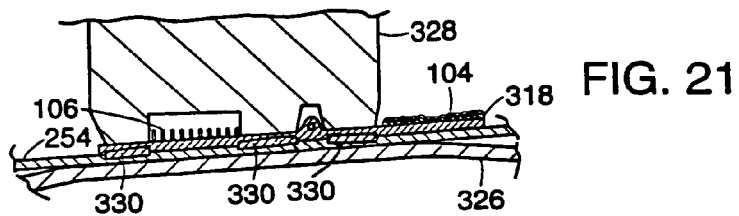
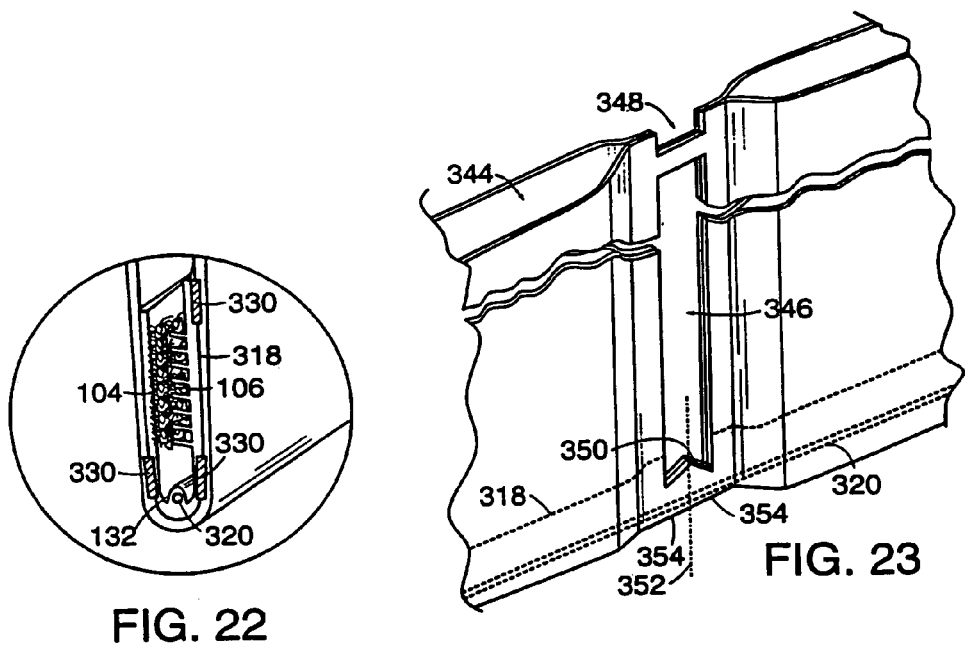
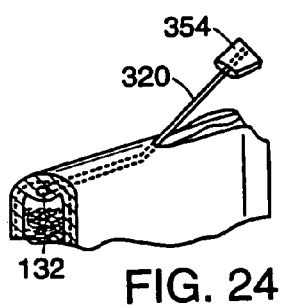

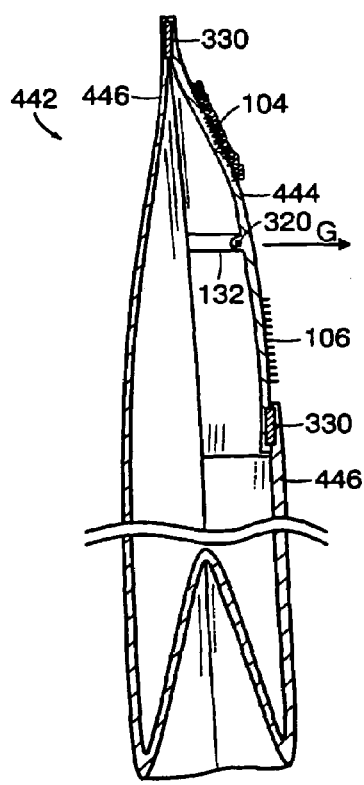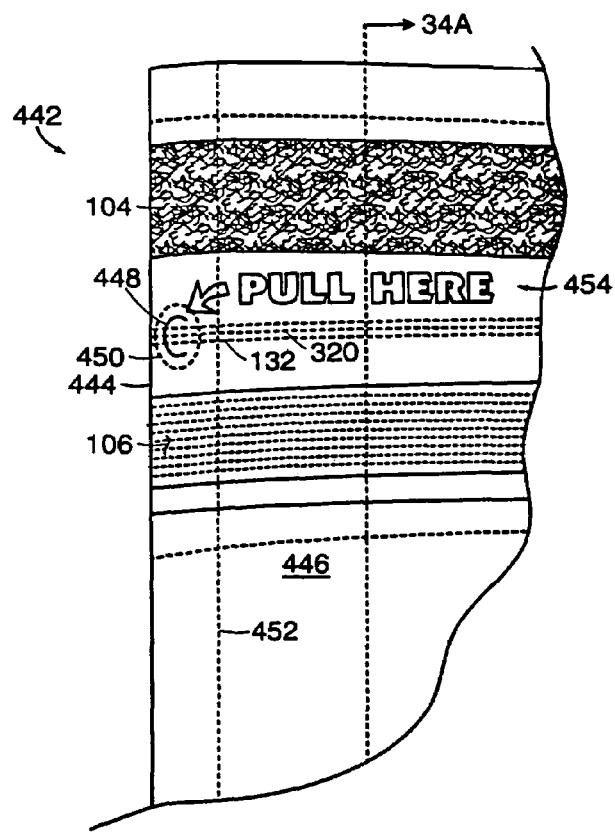
FIG. 34A
FIG. 33

RECLOSABLE PACKAGING

CROSS-REFERENCE TO RELATED APPLICATIONS

This application is a continuation of U.S. patent application Ser. No. 10/357,608, filed Feb. 4, 2003, now U.S. Pat. No. 6,991,375 which is a continuation-in-part of PCT Patent Application Serial No. PCT/US99/26261, filed Nov. 5, 1999, revived by petition filed on Apr. 9, 2003, which is a continuation-in-part of U.S. patent application Ser. No. 09/187,389, filed Nov. 6, 1998, now U.S. Pat. No. 6,202,260. PCT Patent Application Serial No. PCT/US99/26261 claims the benefit of U.S. Provisional Patent Application Ser. No. 60/159,489, filed Oct. 14, 1999 and also claims the benefit of U.S. Provisional Patent Application Ser. No. 60/228,819, filed Apr. 16, 1999, which was converted to a Provisional Patent Application from a Utility patent application Ser. No. 09/293,257. This application respectively incorporates by reference each of the above applications whose priority is claimed.

TECHNICAL FIELD

This invention relates generally to touch fasteners, such as composite touch fasteners having both loops and loop-engageable fastener elements extending from one side of a common substrate, to their application in products such as closure strips for reclosable bags, and to methods and apparatus for their manufacture and incorporation into bags.

BACKGROUND

There has been much development over the last thirty years in the field of hook-and-loop fasteners. Early touch fastener products of this type consisted of two mating tapes, each being knit or woven. One tape would include loops of filament woven into a base, and the other would include filaments woven to form loops and then cut to form hooks. In some cases free ends of drawn plastic filaments on the male tape would be melted to form protruding heads. This shape of fastener element is sometimes called a "mushroom", to distinguish it from "hook"-shaped elements with re-entrant crooks. In some cases, arrays of similar discrete fastening elements on two parts are shaped to engage with each other to form a releasable closure, these being known as "self-engageable" hooks or closures.

More recently, continuous molding of fastener elements extending from a common sheet-form resin base has resulted in less expensive and thinner male tapes. Significant improvements in this area include the development of continuous fastener tape molding using fixed mold cavities (see Fischer, U.S. Pat. No. 4,794,028), and the ability to provide loops on the back side of the male fastener tape as the fastener tape substrate and elements are being formed (see Kennedy et al., U.S. Pat. No. 5,260,015), thus creating a composite fastener tape capable of fastening to itself. Further improvements have reduced the size of the fastener elements moldable by such techniques, to heights of 0.015 inch or less, which provide a very smooth touch when arranged in dense arrays.

Another example of molded fastener tape involves molding perform stems or similar structures integral with a plastic backing substrate, and thereafter performing a forming operation to convert outer portions to a J hook, a mushroom head or similar engaging structure.

As molded fastener tape has been improved to be more flexible and less expensive, it has found application in disposable garments, such as diapers. Further improvements are desirable to extend the applicability of molded touch fastener products to other uses.

One such use that is discussed in more detail below is as a closure for reclosable bags and other such packaging.

Other types of repeated use closures for bags have included, for instance, rib-and-groove type of locking or zipper closures such as are marketed under the name ZIPLOC. These have very different fastening characteristics and exacting requirements for joining to sheet or film in comparison to touch-fastener closures. For example, on zipper style (interlocking rib and groove) products, in order to maintain alignment and the integrity of the seal once it is closed, the ends of such a closure are required to be permanently closed and sealed, to provide a beginning point for effecting closure. Other limitations relating to manufacture and use are also known.

SUMMARY

The invention features, in several of its aspects, a composite touch fastener product having both a band of loops and a band of hooks extending from a single face of a common, sheet-form substrate. Among other applications, this product can be included at the opening of a bag to function as a repeated use closure.

According to one aspect of the invention, an elongated closure strip includes a sheet-form resin substrate having a front face and a back face, an array of loop-engageable fastener elements with stems integrally molded with and extending from the front face of the substrate and forming a discrete band of fastener elements extending longitudinally along the length of the closure strip, and a loop strip carried on the front face of the substrate and forming a discrete band of engageable loops extending along the length of the closure strip and spaced apart from the band of fastener elements. The loop strip is arranged to be engaged by the array of fastener elements when the substrate is folded along a fold line extending between the loop strip and the array of fastener elements. The substrate defines at least one frangible region extending longitudinally along the length of the closure strip between the band of loops and the band of fastener elements, for tearing the substrate between the loops and the fastener elements, to open an associated bag, the frangible region comprising an embedded longitudinally continuous filament adapted to be torn from the closure strip to tear the substrate along the frangible region.

In some embodiments, the filament is completely enclosed within a longitudinal rib integrally molded with and extending from the substrate between the band of loops and the band of fastener elements. The longitudinal rib enclosing the filament may be disposed on the back face of the substrate, for example.

In some cases, the fastener elements have distal ends integrally molded with their stems and the front face of the substrate.

The substrate of some embodiments of the closure strip is advantageously formed of the same material as the substrate, e.g. enabling welding the substrate to the bag material. Such material can for instance be polypropylene, polyester or nylon, chosen for their excellent barrier qualities (as well as polyethylene which has poor barrier qualities), and copolymers and compatible mixtures that include at least one of such resins.

Some embodiments of the closure strip also include an adhesive strip carried on the front face of the substrate between the band of fastener elements and the band of loops.

The adhesive strip has an exposed surface arranged to contact the front face of the closure strip when the closure strip is folded to engage the loops with the fastener elements, to retain the closure strip in a folded state.

Alternatively, some embodiments have a first adhesive strip carried on the front face of the substrate between the band of fastener elements and the pair of grooves, and a second adhesive strip carried on the front face of the substrate between the band of loops and the pair of grooves. The first and second adhesive strips have exposed surfaces arranged to contact each other when the closure strip is folded to engage the loops with the fastener elements, to retain the closure strip in a folded state. In either case, these adhesive strips can advantageously provide an air-tight seal when the closure is closed.

In some cases the closure strip includes a strip of peelable adhesive carried on the front face of the substrate for providing a peelable seal across the opening of an associated bag. For some applications the strip of peelable adhesive is disposed between a longitudinal edge of the closure strip and both of the bands of fastener elements and loops. In some other applications the strip of peelable adhesive is disposed between the bands of fastener elements and loops.

In some embodiments, the closure strip includes a layer of paper permanently adhered to the substrate. In some cases, this layer of paper is carried on the front face of the substrate, in its longitudinal edge regions. In some cases, the paper is carried on the back face of the substrate. In some other cases, the layer of paper is disposed between a center region of the loop strip and the substrate.

In some cases the resin of the sheet or film packaging material or the resin of the backing substrate of a closure strip to be joined to the packaging material, or both, includes an additive in the resin blend or a discrete outer layer, as by coextrusion, of a material that contributes to weldability of the matching surfaces. Such additives include for instance an ionomer such as marketed by duPont under the mark Surlyn™, or an ethylene vinyl acetate (EVA) additive which lowers the weld temperature, or a material known as metalocene which is used to sharpen or adjust the melting range of materials to be welded together.

According to another aspect of the invention, a reclosable bag includes a bag body having two opposing side walls joined along three edges to form between them a pouch having an open end, and a closure strip permanently attached to the two side walls of the bag body along the open end. The closure strip includes a sheet-form resin substrate having a front face and a back face, an array of loop-engageable fastener elements with stems integrally molded with and extending from the front face of the substrate and forming a discrete band of fastener elements extending longitudinally along the length of the closure strip, and a loop strip carried on the front face of the substrate and forming a discrete band of engageable loops extending along the length of the closure strip and spaced apart from the band of fastener elements. The loop strip is arranged to be engaged by the array of fastener elements to releasably retain the bag in a closed condition. The substrate of the closure strip defines at least one frangible region extending longitudinally along the length of the closure strip between the band of loops and the band of fastener elements, for tearing the substrate between the loops and the fastener elements to open the bag, and the frangible region includes an embedded, longitudinally continuous filament adapted to be torn from the closure strip to tear the substrate along the frangible region.

In some embodiments, the filament is fully enclosed within a longitudinal rib extending from the back face of the substrate of the closure strip and disposed inside the bag.

The filament, in some instances, has an end attached to a pull tab extending from one edge of the bag.

In some configurations, the bag defines a slit through an edge region of the bag but not extending into the interior of the bag, the slit defining a graspable pull tab within the edge region and containing an end of the filament.

In some cases, the pull tab is defined between a pair of slits on either side of the filament and extending through an adjacent edge of the bag.

According to another aspect of the invention, a reclosable bag includes a bag body having two opposing side walls joined along three edges to form between them a pouch having an open end, and a closure strip permanently attached to the two side walls of the bag body along the open end. The closure strip includes a sheet-form resin substrate having a front face and a back face, an array of loop-engageable fastener elements with stems integrally molded with and extending from the front face of the substrate and forming a discrete band of fastener elements extending longitudinally along the length of the closure strip, and a loop strip carried on the front face of the substrate and forming a discrete band of engageable loops extending along the length of the closure strip and spaced apart from the band of fastener elements. The loop strip is arranged to be engaged by the array of fastener elements to releasably retain the bag in a closed condition. A second array of loop-engageable fastener elements has stems integrally molded with and extending from the back face of the substrate and forms a second band of fastener elements extending longitudinally along the outer surface of the bag, for hanging the bag for display.

In some instances, the closure strip further comprises a second loop strip carried on the back face of the substrate and forming a second discrete band of engageable loops extending along the outer surface of the bag, for hanging the bag for display.

According to another aspect of the invention, a reclosable bag includes a bag body having two opposing side walls joined along three edges to form between them a pouch having an open end, and a closure strip permanently attached to the two side walls of the bag body along the open end. The closure strip includes a sheet-form resin substrate having a front face and a back face, an array of loop-engageable fastener elements with stems integrally molded with and extending from the front face of the substrate and forming a discrete band of fastener elements extending longitudinally along the length of the closure strip, and a loop strip carried on the front face of the substrate and forming a discrete band of engageable loops extending along the length of the closure strip and spaced apart from the band of fastener elements. The loop strip is arranged to be engaged by the array of fastener elements to releasably retain the bag in a closed condition. Particularly, the front face of the closure strip forms an outer surface of the bag, with the bands of loops and fastener elements carried on the outer surface of the bag.

In some instances, both the band of loops and the band of fastener elements are disposed on a front side of the bag, such that the fastener elements engage the loops when an adjacent edge of the bag is folded over.

In some cases, the substrate of the closure strip defines a frangible region between the bands of loops and fastener elements, the frangible region running along one side of the bag and configured to be torn to open the bag. The frangible region may be configured to be torn by applying a transverse tensile load across the frangible region, such as by being weaker with respect to a transverse tensile load than the side walls of the bag and the attachment between the side walls of the bag and the bag closure.

In some configurations, the side wall forming the front side of the bag has an exposed tab for grasping and pulling the front side of the bag to tear the frangible region of the closure strip. The tab may extend across the front side of the bag.

In some embodiments, the bands of loops and fastener elements are disposed on opposite sides of the bag, such that the fastener elements engage the loops when an adjacent edge of the bag, formed by a fold in the closure strip, is folded over twice. In some cases, with the closure strip is folded over twice, adjacent layers of the substrate together form a barrier to fluids.

According to another aspect of the invention, a reclosable bag includes a bag body having two opposing side walls joined along three edges to form between them a pouch having an open end, and a closure strip permanently attached to the two side walls of the bag body along the open end. The closure strip includes a sheet-form resin substrate having a front face and a back face, an array of loop-engageable fastener elements with stems integrally molded with and extending from the front face of the substrate and forming a discrete band of fastener elements extending longitudinally along the length of the closure strip, and a loop strip carried on the front face of the substrate and forming a discrete band of engageable loops extending along the length of the closure strip and spaced apart from the band of fastener elements. The loop strip is arranged to be engaged by the array of fastener elements to releasably retain the bag in a closed condition. Particularly, the substrate of the closure strip carries printed indicia visible from outside the bag.

According to another aspect of the invention, a reclosable bag includes a bag body having two opposing side walls joined along three edges to form between them a pouch having an open end, and a closure strip permanently attached to the two side walls of the bag body along the open end. The closure strip includes a sheet-form resin substrate having a front face and a back face, an array of loop-engageable fastener elements with stems integrally molded with and extending from the front face of the substrate and forming a discrete band of fastener elements extending longitudinally along the length of the closure strip, and a loop strip carried on the front face of the substrate and forming a discrete band of engageable loops extending along the length of the closure strip and spaced apart from the band of fastener elements. The loop strip is arranged to be engaged by the array of fastener elements to releasably retain the bag in a closed condition. Particularly, the substrate of the closure strip defines a hole forming a graspable handle for carrying the bag.

According to another aspect of the invention, a continuous sheet-form product useful for forming bags, includes a continuous sheet-form film and a length of closure strip permanently bonded to the film. The closure strip includes a sheet-form resin substrate having an exposed front face, a loop strip carried on the front face of the substrate and comprising a discrete band of hook-engageable loops extending along the length of the closure strip, and an array of loop-engageable fastener elements with stems integrally molded with resin of the front face of the substrate and forming a discrete band of fastener elements extending longitudinally along the length of the closure strip and spaced apart from the band of loops.

In some cases, the closure strip is continuous and extends along the film centerline. In some other cases, the closure strip extends along one edge of the film.

In some embodiments, the closure strip extends transversely across the film.

According to another aspect of the invention, a continuous sheet-form product useful for forming bags includes a continuous sheet-form film and multiple lengths of closure strip extending transversely across the film at spaced intervals and permanently bonded to the film. Each length of closure strip has two overlapping substrates, each substrate bonded separately to the bag film on opposite sides of an associated frangible region of the film, a loop strip carried on the front face of the first substrate and comprising a discrete band of engageable loops extending along the length of the closure strip, and an array of loop-engageable fastener elements extending from the second substrate and forming a discrete band of fastener elements extending longitudinally along the length of the closure. The first and second substrates are overlapped as bonded to the film, such that the bands of loops and fastener elements overlap for engagement.

In some embodiments, the fastener elements have stems integrally molded with resin of the front face of the second substrate.

According to another aspect of the invention, a method of fabricating a closure strip includes molding a continuous, sheet-form substrate having a band of fastener elements with stems integrally molded with and extending from a front face of the substrate, attaching a continuous strip of loop material to resin forming the front face of the substrate to form a discrete band of loops spaced apart from the band of fastener elements, and embedding a longitudinally continuous filament in resin of the substrate.

In some embodiments, the filament is completely enclosed by resin of a rib extending from one face of the substrate.

According to another aspect of the invention, a method of fabricating reclosable bags includes providing a continuous length of sheet-form bag wall material, providing a continuous closure strip, permanently attaching the closure strip along the sheet-form bag wall material to form a continuous length of preform bag material, and forming individual bags from the preform bag material. The closure strip includes a sheet-form resin substrate having a front face, a loop strip carried on the front face of the substrate and forming a discrete band of engageable loops along the length of the closure strip, and an array of loop-engageable fastener elements with stems integrally molded with the front face of the substrate and forming a discrete band of fastener elements extending longitudinally along the length of the closure strip and spaced apart from the band of loops.

In some cases, the step of attaching produces a preform tube of bag material, and the steps of attaching and forming are performed simultaneously in a vertical form and fill process, with the individual bags containing a predetermined quantity of material to be stored in the bags.

In some applications, the closure strip is attached to longitudinal edges of the sheet-form plastic to form a fin seal of the preform tube.

In some embodiments, the closure strip is folded to form a fold extending outward, away from the preform tube, such as with the fold defining a distal edge of the fin seal.

In some other embodiments, the closure strip is folded to form a fold extending inward, toward the preform tube.

In some cases, the step of attaching produces a preform tube of bag material, and the steps of attaching and forming are performed simultaneously in a horizontal form and fill process, with the individual bags formed about associated packages of material.

In some embodiments, longitudinal edges of the bag side wall material are brought together to form a fin seal with the closure strip folded longitudinally and disposed within the fin seal, or with the closure strip folded longitudinally about and attached to the longitudinal edges of the bag side wall material.

In some applications, the step of attaching includes folding the closure strip along its length to engage the bands of loops and fastener elements in an engagement zone, the loops and fastener elements holding their underlying regions of the substrate in spaced apart relation. The step of attaching may include welding the bag side wall material to the back face of the substrate, the engagement zone providing a heat barrier to inhibit permanently welding the substrate together in its folded condition.

In some instances, the step of forming includes folding the preform bag material along its centerline, and then forming transverse seals spaced along the preform bag material at bag length intervals to form a chain of open-ended bags. The closure strip may be attached along the bag side wall material between longitudinal edges of the material, with the preform bag material being subsequently folded at the closure strip to engage the bands of loops and fastener elements.

In some cases, the step of attaching includes individually folding the bag side wall material and the closure strip, and then joining the folded wall material and closure strip along their longitudinal edges to form a continuous tube of preform bag material. The step of forming may involve creating transverse seals across the tube of preform bag material to form a series of discrete, empty bags.

The bag side wall material may be provided as two separate material sheets, with the step of attaching including attaching the closure strip to one longitudinal edges of each sheet, such that the preform bag material comprises the two material sheets joined at the closure strip, and the step of forming individual bags involving forming transverse seals across the preform bag material and joining the other longitudinal edges of the sheets of material to form a series of sealed bags.

In some cases the closure strip contains an embedded pull cord, with the step of forming including forming a graspable pull tab extending from an edge of each bag, the pull tab containing an end of the pull cord. The graspable pull tab may be formed by slitting each bag in a side seal area thereof, with the slitting cutting through the pull cord but not extending into the interior of the bag. In some applications, the slitting forms two slits extending from an adjacent edge of the bag to the filament.

According to another aspect of the invention, a method of fabricating reclosable bags in a vertical form and fill process includes unrolling a continuous length of sheet-form bag film and directing the unrolled film over a forming head, advancing the bag film one bag length between pauses, and forming individual bags from the bag film, each bag having an associated length of closure strip. During each pause, a length of closure strip is attached across the unrolled bag film upstream of the forming head. Each length of closure strip includes a sheet-form resin substrate having a front face, a loop strip carried on the front face of the substrate and forming a discrete band of engageable loops along the length of the closure strip, and an array of loop-engageable fastener elements with stems integrally molded with the front face of the substrate and forming a discrete band of fastener elements extending longitudinally along the length of the closure strip and spaced apart from the band of loops.

In some embodiments, the loop strip comprises a non-woven web of entangled fibers forming the loops and having a basis weight of less than about 4 ounces per square yard (preferably, less than about 2 ounces per square yard). In some cases, the non-woven web comprises a needled web in a stretched condition.

In some embodiments, fibers of the loop strip are affixed to the substrate across the width of the loop strip, such as by being encapsulated by resin of the substrate. By "width" of the loop strip, we mean the entire transverse dimension of the preformed strip, as measured between the outermost edges of the preformed strip before it is attached to the substrate.

In many cases, the loop strip has a fiber density which is substantially constant across its width, yet the loop strip has discrete regions which are more encapsulated by resin than other regions of the loop strip. These discrete, more encapsulated regions may be spaced apart longitudinally along the loop strip, extend lengthwise along the loop strip and be spaced apart widthwise, or be arranged in a checkerboard pattern, for instance.

When we refer to regions of the loop strip as being more "encapsulated" than other regions, we mean that the fibers of the more encapsulated regions are generally more thoroughly embedded in the resin of the substrate than the fibers of other regions. Generally, this will involve a deeper penetration of the substrate resin into the loop strip.

In some embodiments, longitudinal edge regions of the loop strip are affixed to the substrate, while a center region (between the edge regions) is substantially loose from the substrate. The center region of the loop strip may advantageously define a gentle arc extending away from the substrate in some of these embodiments.

In some configurations, a barrier layer (of a different material than the substrate) is included between the substrate and the loop strip. This barrier layer may be of paper or a polymer resin, for example.

In some cases the loop strip has at least one edge which is substantially loose from the substrate. This edge may be either an inner or outer edge in a finished bag, and can help to redirect peel separation forces to enhance the peel strength of the fastening.

In some closure strips, open-ended pockets are defined between an edge of the loop strip and the substrate. These pockets can also help to enhance peel strength in some cases.

In some embodiments, the edge regions of the loop strip have fibers directly encapsulated within resin of the substrate, while the closure strip also includes a binder (of a different material than the substrate) connecting fibers of the center region (between the edge regions) of the loop strip to resin of the substrate.

In some embodiments, the substrate defines a pair of grooves extending longitudinally along the length of the closure strip between the band of loops and the band of fastener elements. These grooves may be lengthwise continuous and defined by molded surfaces in the front face of the substrate.

The closure strip also includes, in some cases, a longitudinal rib integrally molded with and extending from the front face of the substrate between the band of loops and the band of fastener elements. In some of these cases, the rib is disposed between the pair of grooves just described.

In some embodiments, the front face of the substrate has two longitudinal edge regions void of fastener elements and loops, for permanently adhering the substrate to the sides of a bag. These edge regions may be covered with a layer of adhesive for permanently attaching the closure strip to opposite sides of a bag, or comprise exposed resin of the substrate, for permanently welding the closure strip to opposite sides of a bag formed of a compatible material. These longitudinal edge regions may alternatively be disposed on the back face of the substrate.

The substrate of some embodiments of the closure strip is advantageously formed of polyethylene, such as for welding the substrate to polyethylene bag material.

Some embodiments of the closure strip also include an adhesive strip carried on the front face of the substrate between the band of fastener elements and the band of loops. The adhesive strip has an exposed surface arranged to contact the front face of the closure strip when the closure strip is folded to engage the loops with the fastener elements, to retain the closure strip in a folded state.

Alternatively, some embodiments have a first adhesive strip carried on the front face of the substrate between the band of fastener elements and the pair of grooves, and a second adhesive strip carried on the front face of the substrate between the band of loops and the pair of grooves. The first and second adhesive strips have exposed surfaces arranged to contact each other when the closure strip is folded to engage the loops with the fastener elements, to retain the closure strip in a folded state. In either case, these adhesive strips can advantageously provide an air-tight seal when the closure is closed.

In some embodiments, the closure strip includes a layer of paper permanently adhered to the substrate. In some cases, this layer of paper is carried on the front face of the substrate, in its longitudinal edge regions. In some cases, the paper is carried on the back face of the substrate. In some other cases, the layer of paper is disposed between a center region of the loop strip and the substrate.

According to a second aspect of the invention, an elongated closure strip includes a sheet-form resin substrate having front and back faces, a loop strip carried on the front face of the substrate, and an array of loop-engageable fastener elements carried on the front face of the substrate. The loop strip forms a discrete band of hook-engageable, free-standing loops along the length of the closure strip, and the array of fastener elements forms a discrete band of fastener elements extending longitudinally along the length of the closure strip and spaced apart from the band of loops. The substrate defines a pair of grooves extending longitudinally along the length of the closure strip between the band of loops and the band of fastener elements, and a longitudinal rib integrally molded with and extending from the substrate between the pair of grooves.

In some embodiments, the loop strip comprises a nonwoven web of entangled fibers forming the loops and having a basis weight of less than about 4 ounces per square yard (preferably, less than about 2 ounces per square yard).

In some cases, the grooves and rib are disposed on the front face of the substrate. In other cases, they are disposed on its back face.

Preferably, the fastener elements are integrally molded with resin of the substrate.

In some cases, the strip of loop material has regions of substantially higher loft than regions corresponding to the discrete regions which are substantially more encapsulated by resin. By "loft", we mean the distance the exposed loops of the loop material extend from the front face of the substrate, as presented for engagement by fastener elements.

Some aspects of the invention feature a bag closure having matable touch fastener elements arranged in parallel strips extending from an outer surface of a bag. Between the strips of fastener elements is a frangible region adapted to be torn apart to initially open the bag. After initial opening, the bag is reclosed by folding the closure about the torn frangible region to engage the strips of matable fastener elements.

In some embodiments, one of the strips of fastener elements is a band of hook-engageable loops or fibers, the other strip being of extending male fastener elements, such as hooks or mushrooms.

In some other embodiments, the strips are of self-engageable male fastener elements, having arrays of spaced-apart elements that are designed to interlock, for example, when pressed together.

Preferably, the closure is a continuous, thin, strip-form extrusion of plastic material upon one face of which the fastener elements are either integrally molded of material of the extrusion or bonded to the extrusion while the extrusion is in a softened state, such that the fastener elements are joined directly to the extruded material, or are formed out of the extruded material, without separate adhesives or bonding agents.

The frangible zone may be, for instance, a channel formed in one face of the extruded material between the strips of fastener elements. The channel may be either on the outer or inner face of the closure, as incorporated into a bag.

Joined with bag material to form a bag, the closure is preferably arranged such that the frangible zone extends parallel to and adjacent one edge of the bag. By adjacent, we mean that the frangible zone is preferably between one-half and two inches from the bag edge, such that sufficient space is provided between the frangible zone and the bag edge to grasp the edge region of the bag with one hand while, with the other hand, the main body of the bag is pinched, on the other side of the frangible zone, and pulled away from the frangible zone to tear the closure along the frangible zone.

In one preferred bag construction, the bag material forming the back face of the bag is permanently bonded to the back surface of the closure along one closure edge, and the bag material forming the front face of the bag is permanently bonded to the front face of the closure along its opposite edge, in an edge bonding zone free of fastener elements.

As an alternative to pinching the main body of the bag to separate the closure along its frangible zone, a pull flap may be provided at the connection of the closure to the bag material forming the front face of the bag. The pull flap may either be in the form of a loose edge of the bag material not joined to the closure but exposed along the closure to be grasped and pulled, or a discrete, local flap of bag material formed, for instance, by die-cutting the bag material prior to attaching the closure.

In one embodiment, the closure is formed of polyethylene and has a nominal thickness of about 0.004 inch (0.1 millimeter). The frangible zone is a groove in which the thickness of the closure is reduced to about 0.002 inch (0.05 millimeter) over a groove width of about 0.036 inch (0.9 millimeter). Such a construction can provide acceptable tear properties when incorporated into a bag otherwise formed of 0.002 to 0.005 inch thick (0.05 to 0.125 millimeter thick) polyethylene, for example.

In another embodiment, the frangible zone includes a pull rib which is designed to be pulled along the closure from one edge of the bag to the opposite bag edge, thereby tearing the closure between the strips of fastener elements. In such embodiments, the pull rib may be exposed for grasping by forming a hole or notch through the bag material of the back face of the bag extending partially across the width of the side seal of the bag, immediately behind the pull rib. With the back face of the bag relieved or otherwise spaced apart from the end of the pull rib, the end of the pull rib can be readily grasped and pulled along the width of the bag to initially open the closure.

According to further aspects of the invention, methods of applying a reclosable fastener to sheet or film are provided, which include the steps of providing inter-engageable closure strip portions which are either separate strips or strip portions of a common member and joining the backing of the strip portions to respective portions of the surface of the sheet or film by application of energy such as heat, acoustic or radio-frequency energy, to produce for instance welding or adhesive bonding. At least a first of the closure strip portions provides an array of discrete fastener elements such as hook elements having crooks or hook elements having mushroom form, the fastener elements having stems integrally molded with and extending from a thermoplastic backing substrate. The other of the strip portions provides an array of engageable elements such as hook-engageable loops or fibers, or elements self-engageable with fastener elements of the first strip portion, such that the discrete elements of the strip portions are capable of forming a releasable closure. In one aspect, during joining, the fastener elements of the respective strip portions are inter-engaged and the backings of the strip portions are simultaneously joined to respective portions of the sheet or film by application of energy to the respective sheet or film portions, with insulating air pockets provided in the space created by the inter-engaged elements serving to limit thermal transfer and unwanted adhesion or bonding of the closure portions to each other.

In another aspect, the cooperating parts of the releasable closure are of materials that are incompatible or of significantly different melting temperatures such that, under temperature conditions of joining, the interengaged elements do not tend to adhere to each other. Such provisions can avoid the need for presence of a release sheet during the joining action.

In one example, loops or fibers of the second strip portion are encapsulated by and secured by thermoplastic resin of the backing of the respective closure strip portion, the loops or fibers being comprised of resin, such as polyester, that is incompatible with or has a higher melting temperature than the resin such as polyolefin, of the respective backing substrate, and/or of components of the opposed first strip portion, such that, under conditions of joining, the dissimilarity of the material of the loops or fibers serves to prevent detrimental change to the loops or fibers or detrimental adhesion or bonding of the loops or fibers to the first closure strip portion, preferably, the mass of the hook elements of the first portion being substantially greater than that of the loop elements, the thermal mass of the hook elements being sufficient to prevent undue distortion of the hooks during the joining action.

The methods described herein are advantageously applicable to both vertical form and fill packaging and horizontal form and fill packaging, as examples. The method is also employed to advantage during pouch making.

In such cases it is to be noted that the invention does not require, in many respects, the use of any particular resin for the various components. This permits the use of backing substrates of e.g. polypropylene, polyester and nylon for desired barrier qualities that polyethylene does not provide.

Also, in cases desired, a wide range of compatibility layers may be employed. For instance, for joining a polyester backing of a closure strip to a polyester sheet or film, a lower melting point layer on either component that adheres to each can be applied. In another case, or where the sheet is a plain or coated paper either a bonding layer may be introduced to one f the mating surfaces or the substance of the backing substrate itself may be used as the bonding surface, e.g. where the backing is polyethylene.

According to still another aspect of the invention, a reclosable flexible package is formed of flexible plastic film of wall thickness less than about 0.005 inch and includes a reclosable, elongated closure in which the reclosable fastener has opposable strips adapted to be facially engaged to close the package. The strips are constructed to be usefully engaged upon application of a uniform facial engagement force of less than about one pound per lineal inch of closure, and to be opened by a transverse peel force of less than about two pounds per lineal inch of closure.

In some embodiments each of the strips have a bi-dimensional field of at least one type of discrete fastener elements, the fastener elements of each strip being constructed to individually interact with elements of the other opposable strip to form a field of localized releasable fastenings to form a peel-open closure. In some instances each strip has at least two types of discrete fastener elements, with hooks of each strip engage with loops of the other.

In some cases the strips each comprise loops and loop-engageable fastener elements.

Preferably, the closure is less than about one inch in width and has multiple interlaced rows of loop-engageable fastener elements and rows of loops. For instance, in some cases there are at least 10 rows of loop-engageable elements and 10 rows of loops across the width of the closure strip. Preferably, the fastener element density is greater than about 1000 fastener elements per square inch of closure.

In some cases the loops are formed of the filaments of multi-filament yarn.

In some embodiments the closure contains a molded strip having parallel rows of fastener elements molded integrally with a face of the strip, and, interspersed between groups of from one to three adjacent rows of fastener elements, at least one continuous, multi-filament yarn bonded the face of the strip, with filaments of the yarn extending from the face of the strip for engagement by the fastener elements. The multi-filament yarns may be permanently crimped or staked to the face of the strip at spaced apart points along the strip, for example.

In some instances the yarns are comprised of polyester.

In some cases the fastener elements are formed of polypropylene. Another aspect of the invention features a bag closure having matable touch fastener elements arranged in parallel strips extending from one surface of a bag. Between the strips of fastener elements is a frangible region adapted to be torn apart to initially open the bag. After initial opening, the bag is reclosed by folding the closure about the torn frangible region to engage the strips of matable fastener elements.

Various aspects of the invention can provide a bag closure that is readily opened without the level of fine motor control required to manipulate very small features. This can be particularly important for users who, due to arthritis, weak eyesight or other disabilities have a lower level of dexterity.

As a repeated use closure, the product of the invention can provide a ventilated, easily alignable seal. As the bands of loops and fastener elements may be made relatively wide, there is no need for accurate alignment to form a reliable closure. The closure is able to accommodate a fair amount of dirt or debris without losing its function as a closure, making it particularly applicable as a closure for bags containing granular or powder substances. In addition, the natural porosity of the closure can provide some degree of filtering of airborne dust. Such a ventilated closure can be particularly desirable in cargo containers of airplanes in order to accommodate pressure changes, and, by its venting action, may help to avoid moisture buildup to keep produce and other such items fresh. The continuous closure strip is readily adaptable to standard bag-making equipment and, in many instances, is directly weldable to compatible bag materials. These advantages accrue to bags produced according to the invention and having such a repeated use closure.

If made of an appropriate width, the closure strip of the invention can be folded and sealed to itself to form an enclosed bag.

Other features and advantages will be apparent from the following detailed description and attached drawings, and from the disclosures of our earlier U.S. patents and patent applications incorporated by reference above.

DESCRIPTION OF DRAWINGS

FIG. 1 is a perspective view of a composite touch fastener in the form of a closure strip.

FIGS. 1A and 1H are enlarged views of areas 1A and 1H, respectively, in FIG. 1.

FIG. 3 is a cross-sectional view of the closure strip, folded and installed at the opening of a bag in a sealed condition.

FIGS. 4A and 4B illustrate a bag with the closure strip of FIG. 1, in sealed and opened conditions, respectively.

FIG. 5 is an enlarged cross-sectional view of the outer edge of the closure strip being grasped to open the bag.

FIG. 15 illustrates a second vertical form/fill bagging apparatus, configured to accommodate the closure strip of the invention.

FIG. 15A is an enlarged view of the means for joining the closure strip to the bag web in FIG. 15, with portions removed to show the configuration of the insulator rail and sealing jaws.

FIG. 16 is a cross-sectional view, taken along line 16-16 in FIG. 15.

FIG. 20 shows an apparatus and method for forming bags to be filled from an open end opposite their closures.

FIG. 21 is a cross-sectional view, taken along line 21-21 in FIG. 20.

FIG. 22 is an enlarged view of area 22 in FIG. 20, showing the configuration of the closure as applied to the web.

FIG. 23 shows one configuration of an edge seal formed between two adjacent bags in the process of FIG. 20, for forming exposed closure pull tabs.

FIG. 24 illustrates opening a bag with an exposed closure pull tab, such as formed from the edge seal configuration of FIG. 23.

FIG. 33 is a partial outer view of an upper corner of a pouch having a recloseable top.

FIG. 34A is a side cross-sectional view of the pouch of FIG. 33, taken along line 34A, showing the structure and attachment of the closure strip.

DETAILED DESCRIPTION

Figure 1B:
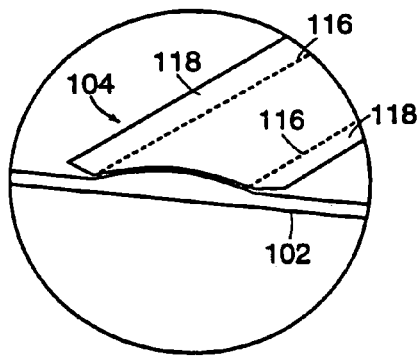
FIGS. 1B through 1G illustrate the structure of area 1A in various other closure strip embodiments.

Referring to FIG. 1, a lengthwise-continuous closure strip 100, such as for sealing a bag, consists of a thin, sheet-form resin substrate 102 with lengthwise-continuous, parallel bands 104 and 106 of loops and fastener elements, respectively, on its front face 108. Bands 104 and 106 are equally spaced from the center "C" of the closure strip, such that when the strip is folded longitudinally at "C" to cover front face 108, the fastener elements of band 106 engage and retain the loops of band 104 to form a releasable fastening. The fastener elements 110 of band 106 are integrally molded with and extend from front face 108. In this embodiment, these fastener elements are in the form of J-hooks that extend, in rows, along the length of the closure strip. Some of the J-hooks face in opposite directions along the strip. Other fastener element shapes may also be employed, including those that overhang the substrate 102 in a widthwise direction. A suitable fastener element shape is the CFM29 hook shape (of about 0.015 inch in height), available in various products sold by Velcro USA in Manchester, N.H.

Band 104 of loops consists of a preformed, non-woven web of polymer fibers, which may include a stabilizing binder, and which are bonded to front face 108 of substrate 102 at various points across the width and length of the web. Suitable loop materials include those disclosed in U.S. Pat. No. 6,342,285, and in the related PCT patent application PCT/US98/18401, filed as a continuation in part of the foregoing application, the entire disclosures of which are hereby incorporated by reference as if fully set forth.

Preferably, the non-woven loop material in band 104 is very thin, such as less than about 0.040 inch thick (more preferably, less than about 0.020 inch thick), with web fibers held in a transversely stretched condition and freestanding loop structures extending from its exposed surface. As discussed in the above-referenced patent applications, the loop structures extend from associated knots in the stretched web, which may be stabilized by liquid binder wicked into the knots and cured. Between knots, the thin fiber mat is not very dense and is sheer enough to permit images to be readily seen through it. Overall, the loop material has a basis weight (in its preformed state, including any pre-applied binder) of less than about 4 ounces per square yard (136 grams per square meter), preferably less than about 2 ounces per square yard (68 grams per square meter). Other details of this loop material may be found in the above-referenced applications. For applications in which the loop material is partially penetrated by resin of the substrate as the substrate is formed (as discussed below), the needled loop material is preferably only stretched in a transverse direction only about 22 percent to leave a fair amount of loft and avoid total penetration.

In some instances, loop material 104 is partially encapsulated directly in resin of the substrate as the substrate is formed in a continuous molding process (described below). In other cases, it is bonded to the formed substrate, either by ultrasonic bonding, welding, or adhesives.

Some lightweight knits are also suitable loop materials for certain applications. Examples of such knits are Product 19902 from Guilford Knits in Greenville, S.C., which is of polyester fibers and has a basis weight of only about 1.6 ounces per square yard. For a heavier knit, we prefer Guilford's Product 19029, a nylon knit of about 3.3 ounces per square yard. Lightweight knit products are also available from TYBOR in Spain, and MIZARD in Italy.

FIGS. 1A through 1D illustrate various patterns of variable bonding between loop material 104 and substrate 102. Such variable bonding patterns correspond, in some cases, to variable resin penetration into the web of the loop material, which may be achieved by employing different arrangements of staking rings and/or barrier materials between the loop material and substrate, both of which are discussed further below. In FIG. 1a, loop material 104 is only fully penetrated by substrate resin in narrow edge regions 114, and is less penetrated at its center. For instance, if loop material is about ¾ inch wide ($W_L$), then fully penetrated edge regions 114 may have a width of only about ⅛ inch ($w_e$). The center region of the loop material is less penetrated and gently arches away from the substrate, presenting the loops for engagement. The inclined sides of the center arch can also help to enhance the peel strength of the fastening at the edges of the loop material, as they resolve a small component of the peel force in a tangential, or shear, direction.

Figure 2A:
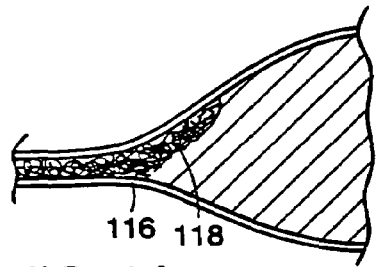
FIG. 2A illustrates the application of fill-shifting loads in a bag having the closure strip of FIGS. 1 and 1B.
Figure 2B:
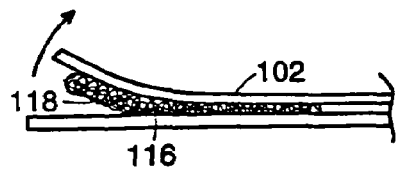
FIG. 2B illustrates the application of peel force to the closure strip of FIGS. 1 and 1B.

In FIG. 1B, the loop material is fully bonded to the substrate in narrow bands 116 spaced inward from its edges, leaving edge regions 118 relatively lightly bonded, or even loose. One advantage of this bonding pattern is that the inner edge region 118 on the inside of the associated bag helps to deflect separation loads caused by shifting bag contents, which would otherwise generate high peel forces between the fastener elements and the loops, into separation forces between the loop material and substrate (as illustrated in FIG. 2A). The high bonding strength of inner band 118 helps to avoid delamination of the loop material from the substrate. Another advantage of this bonding pattern is that it enhances initial peel strength of the fastening, as the outer edge region 118 of the loop material follows the fastener elements during peel until it is separated in shear (FIG. 2B).

Figures 30, 31, 32:
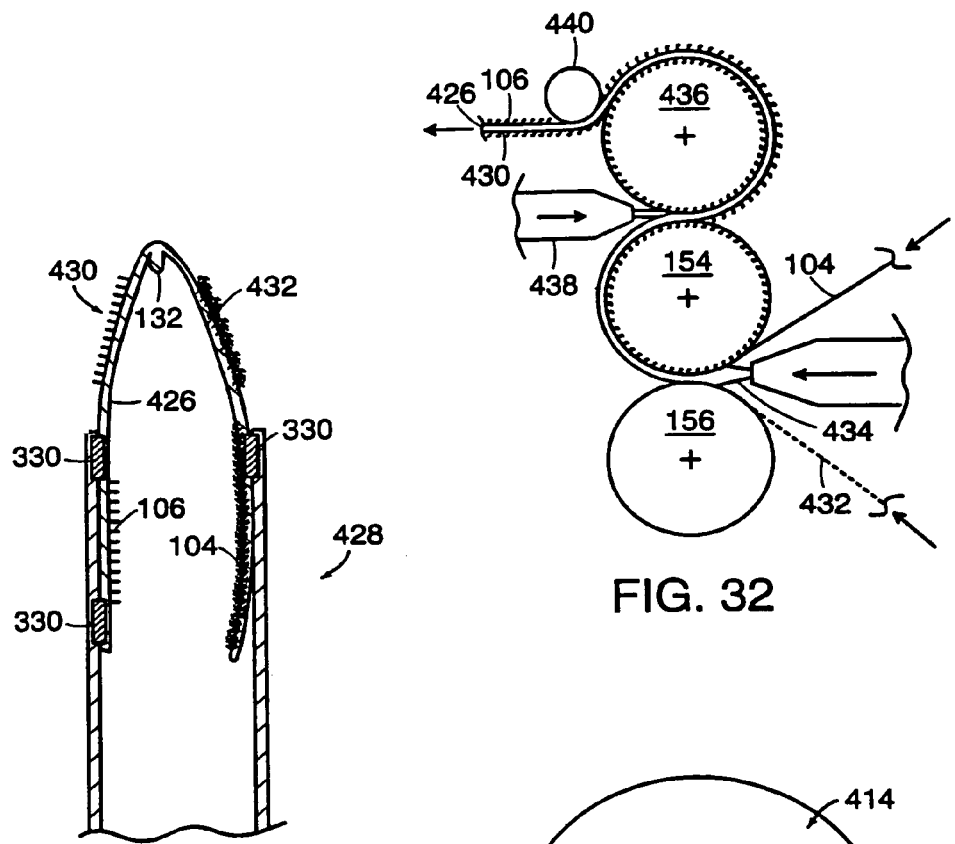
FIG. 31 is a cross-section through a bag having a closure strip with exposed loop-engageable elements extending from an outer bag surface.
FIG. 32 illustrates a method and apparatus for forming the closure strip of FIG. 31.

Having only one inner edge region 118 unbonded can in some instances provide better inner opening resistance (e.g., from content shifting) than having both inner edge regions free. We presently prefer to leave only the edge of the loop side of the closure strip unattached to the bag web in most cases, as shown in FIG. 31 (discussed below), with the hook side edge bonded to the inner surface of the bag web.

Figure 2C:
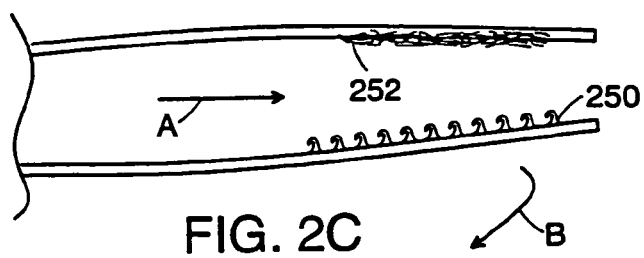
FIG. 2C illustrates another closure strip configuration providing an inner/outer peel preference.

Another closure arrangement for providing good resistance to being opened from inside the bag but readily opened from outside the bag is shown in FIG. 2C. All of the hook elements 250 are arranged with their loop-engaging tips facing the inside of the bag, providing a difference in inside and outside peel resistances. With the hooks fully engaging the loops of loop material 252, peel forces applied to the closure by movement of bag contents in the direction of arrow "A" are resisted to a greater degree than user-applied peel forces in the direction of arrow "B."

Figure 1C:
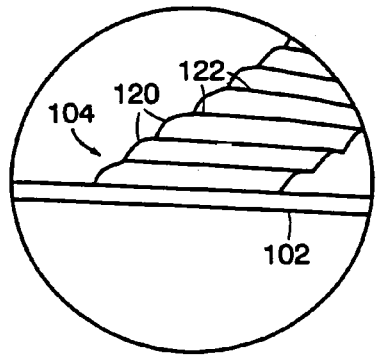

The pattern of variable bonding shown in FIG. 1C creates transverse pillows 120 of relatively lightly bonded, or loose, loop material separated by transverse bands 122 of relatively more fully bonded (e.g., more deeply encapsulated) loop material. The loftiness of pillows 120 is exaggerated for illustration. This pattern provides some of the peel-enhancing and load-shifting advantages of the pattern of FIG. 1B, due to the "free" pillow ends along the inner and outer edges of the loop material.

Figure 1D:
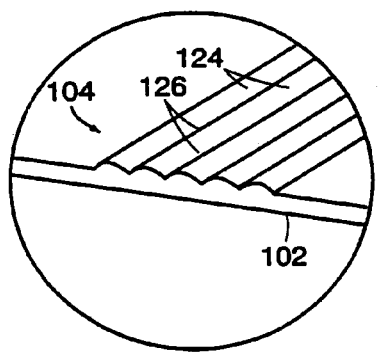
Figure 1E:
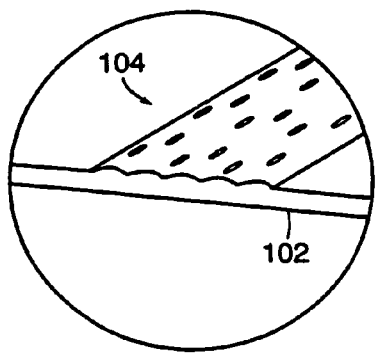
Figure 1F:
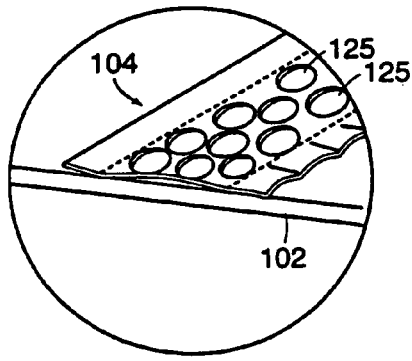
Figure 1G:
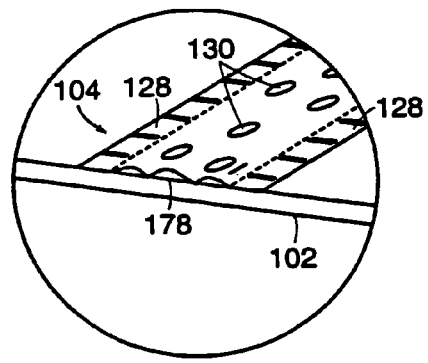

FIG. 1D illustrates a bonding pattern with longitudinal pillows 124 of relatively lightly bonded, or loose, loop material, separated by longitudinal bands 126 of relatively more fully bonded (e.g., more deeply encapsulated) loop material. Again, the loftiness of the pillows is exaggerated for illustration. FIG. 1E is a variation of the pattern of FIG. 1D, with each longitudinal band of more fully bonded material separated into longitudinally alternating regions of light and heavy bonding. The regions of light and heavy bonding are staggered across the loop material, producing a checkerboard pattern of lofted loop pillows. In the pattern illustrated in FIG. 1F, the center region of loop material 104 is heavily bonded to the substrate about the peripheries of spaced apart, circular lofted regions 125 which are less firmly bonded. The exposed surfaces of the lofted loop pillows 125 extend outward to present loops for engagement. Other shapes of lofted regions 125, such as ovals, may also be employed. One of the edge regions of the loop material of FIG. 1F is similar to the edge regions shown in FIG. 1B, while the other forms transverse pillows similar to those of FIG. 1C. FIG. 1G shows a bonding pattern with edge regions 128 of alternating light and heavy bonding, and a center region bonded in only isolated regions 130. The bonding patterns described above may be mixed and varied for different applications, as required.

As an alternative to feeding a preformed sheet of loop material into a forming nip to create the loop band 104 of the closure strip, engageable loops may be formed subsequent to forming the base of the closure strip by stitching loops directly into the base (as in a MALAMO process), or by bonding a strip of loop material to the face of the closure strip.

Referring back to FIG. 1, molded into the front face 108 of substrate 102 along its center is a hump-shaped longitudinal rib 132 between a pair of grooves 134 molded into front face 108. As shown in FIG. 1H, one example of this rib 132 has a height of about 1/32 inch and a width of about 1/32 inch at its base. The rib may have a hump-shaped profile, as shown, or a rectangular cross-section with parallel sides. The rib is preferably longitudinally continuous, as shown, but may alternatively be formed as a row of appropriately shaped protrusions. At least one of the flat regions 135 between grooves 134 and the loop and hook bands 104 and 106 in FIG. 1 contains, in some cases, a layer of adhesive such as a pressure sensitive adhesive (not shown), for providing a reclosable seal for applications where a resealable opening is desired. In these instances surfaces 135 provide an airtight, non-ventilated seal when the bag is closed, and supplement the mechanical closure strength of the hook and loop fasteners. Preferably, an adhesive is employed which has been compounded so that it sticks primarily only to itself or to the opposing face of the substrate, so as to not pick up excessive debris from the bag contents. In other, non-illustrated embodiments, either grooves 134 or rib 132, or both, are formed on the back face of the substrate, opposite the fastener elements and loop material.

The formed closure strip 100 is permanently installed at the openable end of a bag by attaching edge regions 136 of the closure strip to outer edges of the bag at its opening, with the loop and hook bands facing each other, as shown in FIG. 3. The bag may be attached to the back face of the closure strip as shown, in which case edge regions 136 are defined on the back face of the closure strip, or on the front face, with the edges of the bag on the inside. Methods of attaching the closure strip to the bag include, but are not limited to, welding, gluing, adhering or stitching. One preferable method of attaching a closure strip to a bag of a compatible resin is by directly welding the resin of the closure substrate to the resin of the bag, as discussed below. In this manner, polyethylene closure strips may be readily welded to polyethylene bags.

FIG. 4A illustrates a sealed bag 138 having a polyethylene body 140 welded to closure strip 100 across its openable end. Preferably, the thickness of the substrate of the closure strip is about the same as the thickness of the material of the bag body, in the range of 0.002 to 0.005 inch. Substrates of up to at least 0.015 inch in thickness, however, may be produced by the methods described below. To initially break the seal and open the bag, the outer fold of closure strip 100 is grasped and pulled, thereby tearing the folded edge from the bag from one end of the bag to the other, as shown in FIG. 4B. In grasping the outer fold of the closure strip, the middle rib 132 is grasped between the thumb and forefinger. Rib 132 thus provides an edge of increased thickness for easy grasping. As the folded edge of the closure strip is torn away, the closure strip tears along grooves 134. Grooves 134 function as frangible tear points for initially opening the associated bag, and may be straddled by an associated local thickening of the substrate, such as in the form of ribs or rows of raised bumps (not shown) to direct the propagation of the tear along the grooves.

Figure 6:
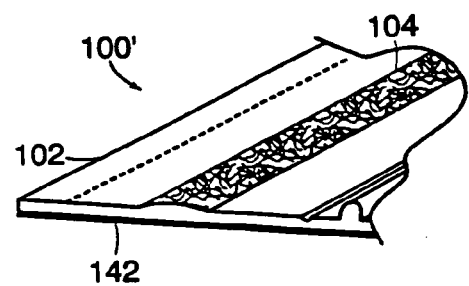
FIG. 6 is a perspective view of a closure strip having a paper backing.

Preferably, the resin of the substrate of the closure strip is compatible with the resin of the bag body, to enable direct welding of the two together. In situations where this is not practical, a separate layer of a bag-compatible material may be provided on the closure strip. For example, a layer of paper 142 may be bonded to either the front face of the closure strip (e.g., in edge regions 136 in FIG. 1), or across the back face of the closure strip as shown in FIG. 6, or along just the edges of the back face of the closure strip (not shown). The paper 142 may be directly bonded to the resin of the substrate (e.g., during the forming of the substrate, as described below), or joined with adhesive after the substrate is formed.

Figure 7:
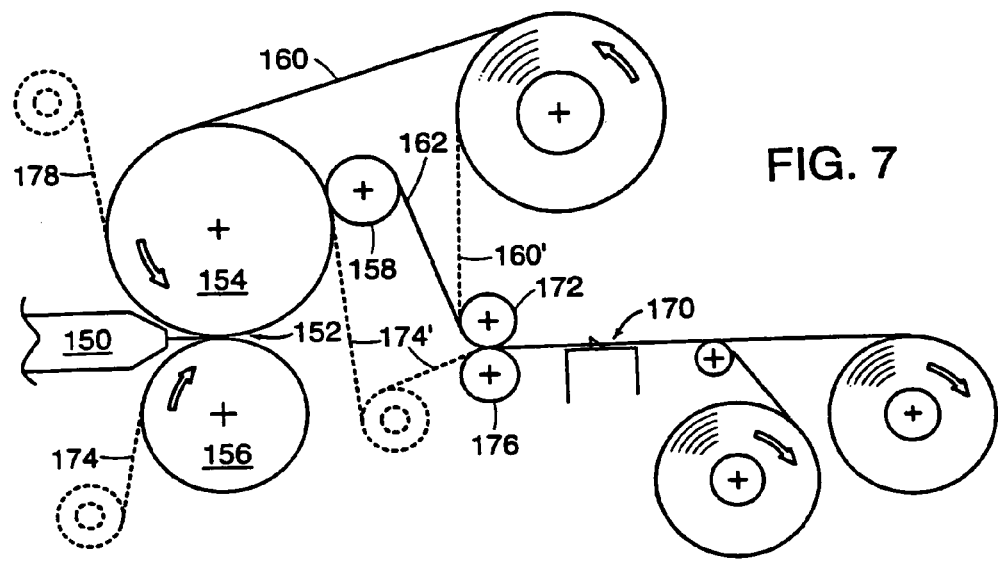
FIG. 7 illustrates a first method and apparatus for forming composite touch fastener tapes, such as the closure strips of FIGS. 1 and 6.

FIG. 7 illustrates one method and apparatus for producing the above-described closure strips. The method builds upon the continuous extrusion/roll-forming method for molding fastener elements on an integral, sheet-form base described by Fischer in U.S. Pat. No. 4,794,028, and the nip lamination process described by Kennedy, et al. in U.S. Pat. No. 5,260,015, the details of both of which are incorporated herein by reference. The relative position and size of the rolls and other components is not to scale. An extrusion head 150 supplies a continuous sheet of molten resin to a nip 152 between a rotating mold roll 154 and a counter-rotating pressure roll 156. Mold roll 154 contains an array of miniature, fastener element-shaped mold cavities extending inward from its periphery (not shown) for molding the fastener elements. Pressure in nip 152 forces resin into the fastener element cavities and forms the substrate. The formed product is cooled on the mold roll until the solidified fastener elements (e.g., hooks) are stripped from their fixed cavities by a stripper roll 158. Along with the molten resin, a continuous strip of loop material 160 (which becomes loop band 104 in FIG. 1) is fed into nip 152, where it is partially impregnated by resin and becomes permanently bonded to the front face of the substrate. Thus the product 162 that is stripped from the mold roll includes both fastener elements and loops.

Figure 8:
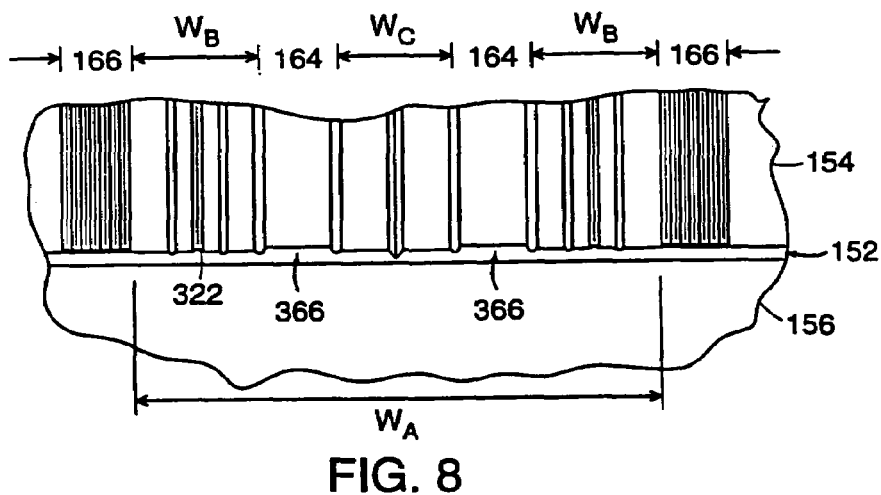
FIG. 8 is an enlarged, unscaled view of the forming nip of the apparatus of FIG. 7.

For higher production rates, two or more widths of closure strip may be simultaneously produced on a single mold roll, and later split and spooled. Referring also to FIG. 8, two strips 160 of loop product are fed in parallel into positions 164 along nip 152. Molten resin is introduced across the entire nip, forming two bands of hooks in regions 166. Mold roll plates of appropriate widths and edge configurations are arranged to produce the ribs and grooves at the center of each closure strip. A splitting channel ring 168 at the center of the mold roll produces a splitting channel in the product, along which the resulting tape is split by a blade 170 (FIG. 7; either stationary or rotating) into two separate runs of closure strip which are separately spooled. In some configurations, a wide section of the mold roll surface is defined by a single, solid roll sleeve having a profiled outer surface for forming one or more of the series of features extending along the closure strip. For instance, in one arrangement, the entire width $W_A$ of the mold roll surface between the hook bands is defined by a single sleeve having a ground circumferential profile defining all features between the hook bands. When thin staking rings (discussed below) are employed in the loop material regions 366, widths $W_B$ and $W_C$ of the mold roll surface are preferably formed by solid, wide mold roll sections. Employing such wide plates provides additional resistance to mold roll bending loads caused by molding nip pressures, enabling wider product widths to be formed without excessive product thickness variations.

FIG. 7 also indicates several variations of the above-described method. For instance, rather than introduce the loop material 160 through nip 152 and thereby join it to the substrate as the substrate is molded, the loop material may be joined to the substrate after the substrate has been formed, such as is indicated by the run 160' of loop material shown in dashed outline. In this case, front face idler 172 is heated and has a contoured surface for producing the desired pattern of bonding between the loop material and the substrate. Paper may be joined to the back face of the substrate, to produce the product shown in FIG. 6, by either running a strip 174 of paper through nip 152 on the pressure roll side of the resin, or by adhering adhesive-coated paper 174' to the formed substrate either at stripping roll 158 or at idler 176. In some cases, adhesive-coated paper 174' includes a transfer coating, such that its paper backing may be peeled from the adhesive on the back of the product to secure the back of the final product to a supporting surface. The adhesive applied to the back of the product in this manner may be either a pressure-sensitive or heat-activated adhesive, for instance. For decreasing the permeability of the final product, a second flow of resin (either molten or in the form of a film) may be added to the nip against pressure roll 156, as strip 174 is shown, to form a backing on the final product. For instance, a layer of polyester may be added to reduce the permeability of a polyethylene closure strip, such as for packaging certain foods. Adding a strip of barrier material 178 between the loop material and the molten resin optionally controls the pattern of penetration of resin into the loop material in nip 152. Barrier material 178 is, in some instances, a perforated paper or film that allows resin to pass into the loop material in selected regions but inhibits its flow into other regions, such as for producing the bonding pattern of the center region of loop material shown in FIG. 1G. The barrier material may also be a homogeneous sheet of material having a high porosity, equally limiting the penetration of resin into the loop material across the width of the barrier material. Rather than be introduced as a separate sheet, in some cases the barrier material is pre-applied to the surface of loop material 160 and may be in the form of a binder located in discrete areas of the loop material and locally encapsulating fibers of the loop material, for instance. In many cases, the barrier material is narrower than the loop material, and centered along the width of the loop material, to enable full penetration of resin into the edges of the loop material. In some cases, however, as to produce the bonding pattern of FIG. 1B, for instance, thin strips of barrier material are run into the nip along the edges of the loop material to inhibit the bonding of edge regions 118 (FIG. 1B) to the substrate. Other arrangements of barrier and loop materials, and resulting bonding patterns, will be apparent upon reading this disclosure. In all cases in which the barrier material becomes permanently bonded to the substrate and therefore becomes an integral part of the final product, it should be selected for its low material cost and weight.

Figure 9:
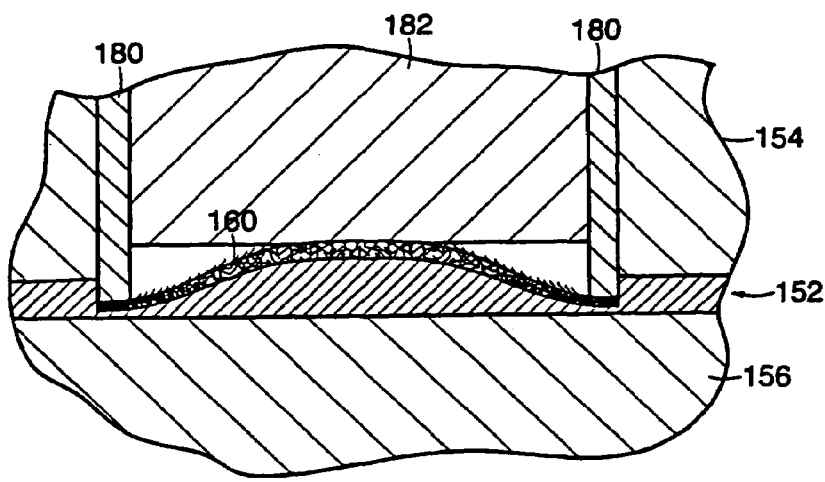
FIG. 9 is a highly enlarged view of the loop material securing region of the nip of FIG. 8.

FIG. 9 illustrates the bonding of the loop material 160 to the resin of the substrate in area 164 of nip 152 (FIG. 8). "Staking" rings 180 on either side of a reduced diameter plate 182 engage the edges of the loop material to locally hold the edges of the loop material against the resin of the substrate as the resin forms the substrate under nip pressure, thereby ensuring heavy penetration of the loop material in predetermined areas along its edges. This configuration shown in FIG. 9 produces the bonding pattern illustrated in FIG. 1A, the staking rings 180 forming heavily bonded edge regions 114, the width we corresponding to the width of the staking ring. The staking rings may extend slightly beyond the nominal mold roll diameter, as shown in FIG. 9, or be flush with adjoining mold roll rings (as shown in FIG. 9A, for example).

Figure 10:
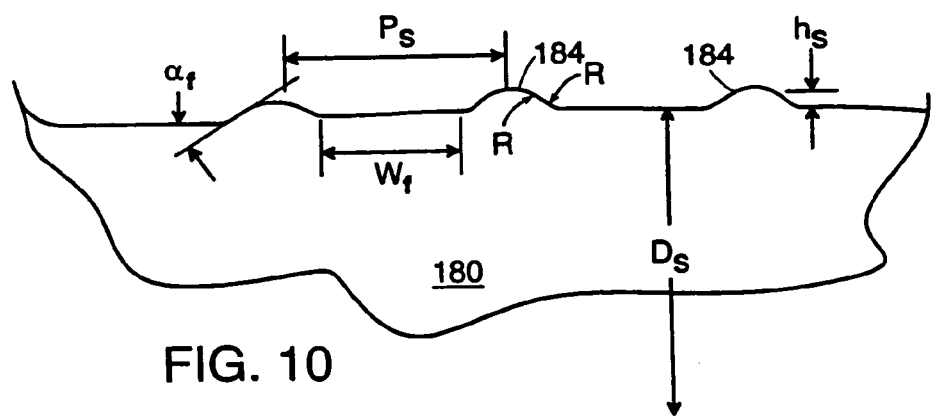
FIG. 10 is an enlarged view of a portion of the outer edge of a staking ring.

To form a row of heavily bonded points separated by regions of lower resin penetration, some staking rings 180 have a contoured outer edge as shown in FIG. 10. A series of protrusions 184 extending beyond the nominal diameter $D_s$ of the staking ring cause the resin to locally penetrate farther into the loop material. In this example configuration, $D_s$ is 9.968 inches, the height ($h_s$) of each protrusion 184 is 0.014 inch, and the inner and outer radii (R) at the flank of each protrusion is 0.015 inch. The protrusion pitch ($P_s$) is 0.190 inch, and the length of the flat between protrusions ($w_f$) is 0.130 inch. The dimensions of the protrusions are selected to attempt to optimize the maximum approach angle $\alpha_f$ of the protrusion flank with respect to a local ring tangent. A steep approach angle (i.e., an abrupt change in ring diameter) can cause a sharp local increase in nip pressure and an undesirable local flooding of the front side of the loop material with resin. Such flooded areas can create local "depth stops" to mating fastener elements, reducing the fastener element penetration into the loop material. A zero approach angle (i.e., no protrusions) would result in a homogeneous resin penetration beneath the staking ring, which may not be as desirable as local loop material "pillowing" (discussed above) in some applications. The maximum approach angle $\alpha_f$ in the illustrated staking ring embodiment is about 40 degrees. A shallower angle (e.g., of about 30 degrees) may be preferable in some cases, as may a longer spacing $w_f$ between protrusions to provide longer, lofted pillow regions.

Figure 9A:
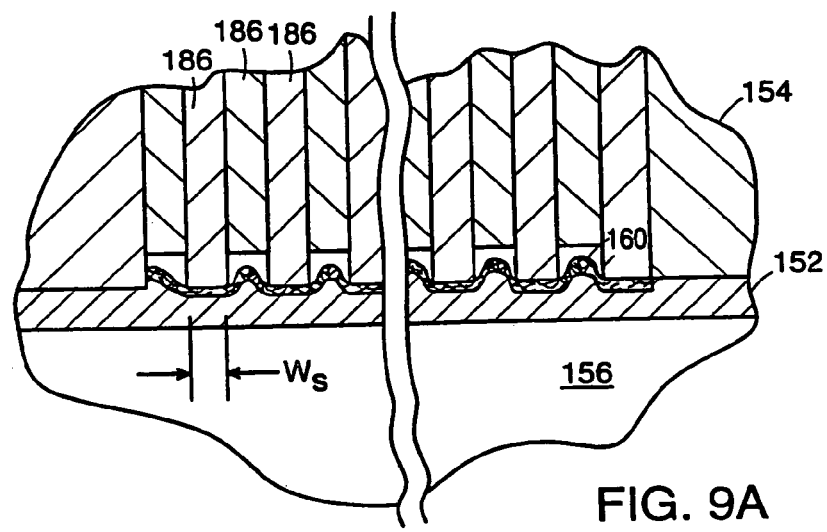
FIG. 9A illustrates an alternative arrangement of the loop material staking region.

FIG. 9A shows a staking ring configuration for producing the bonding pattern shown in FIG. 1E. Staking rings 186 having the profile shown in FIG. 10 are stacked together with staggered protrusions, such that the pattern of heavily bonded regions resembles a checkerboard with elongated "pillows" extending outward between the heavily bonded regions. The width $w_s$ of each ring is about 0.018 inch.

Figure 12:
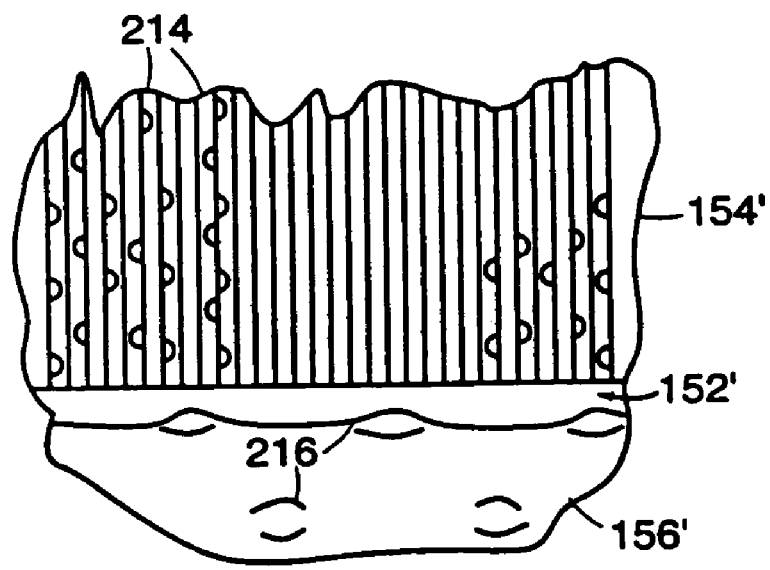
FIG. 12 shows a nip formed between a mold roll and a contoured pressure roll.

This in situ staking method for attaching loop material to the resin of a fastener substrate as the substrate is being formed has broad applicability to the production of composite touch fasteners. For example, FIG. 12 shows a nip 152' between a mold roll 154' and a pressure roll 156'. Mold roll 154' contains many thin fastener element molding rings 214, which may be alternated with spacer rings (not shown), to integrally mold fastener elements extending from one side of a sheet-form base as taught by Fischer. In this case, however, pressure roll 156' has a pattern of protrusions 216 extending from its otherwise smooth surface. The protrusions locally narrow gap 152' in discrete regions, causing a variation in nip pressure during formation of the fastener tape. Running a fibrous preformed material through the nip against the pressure roll with the molten resin, as taught by Kennedy, et al., will, in this configuration, cause fibers of the preformed material to be encapsulated more fully in the resin in areas corresponding to protrusions 216. This in situ "staking" method is particularly useful when the fibrous preformed material is a very porous, thin material such as a needled non-woven web with a low basis weight. The pattern of protrusions on the pressure roll is selected to form an inverse pattern of lofted "pillows" of loop material at most only partially encapsulated in the substrate resin.

Figure 13:
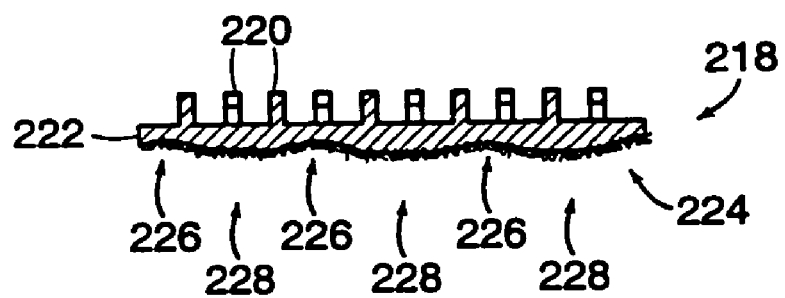
FIG. 13 is a transverse cross-section of a composite fastener tape formed in the nip of FIG. 13.

FIG. 13 is a transverse cross-section of a composite fastener tape 218 produced in this fashion, having an array of hook-shaped fastener elements 220 extending from one side of the substrate 222, and a lightweight, non-woven web of loop material 224 permanently bonded to an opposite side of the substrate. Loop material 224 is coextensive with the substrate in this case (i.e., it extends across the full width of the substrate), but is fully encapsulated in substrate resin only in discrete regions 226. Between regions 226, the loop material forms the above-described "pillows" 228, or lofted regions, which are not fully encapsulated in resin. The loft of pillows 228 enables the heads of fastener elements 220 to penetrate the loop material and engage individual fibers during fastening. A similarly contoured pressure roll 156' (FIG. 12) may also be employed to attach a strip of loop material to the fastener element side of a fastener tape.

Figure 11:
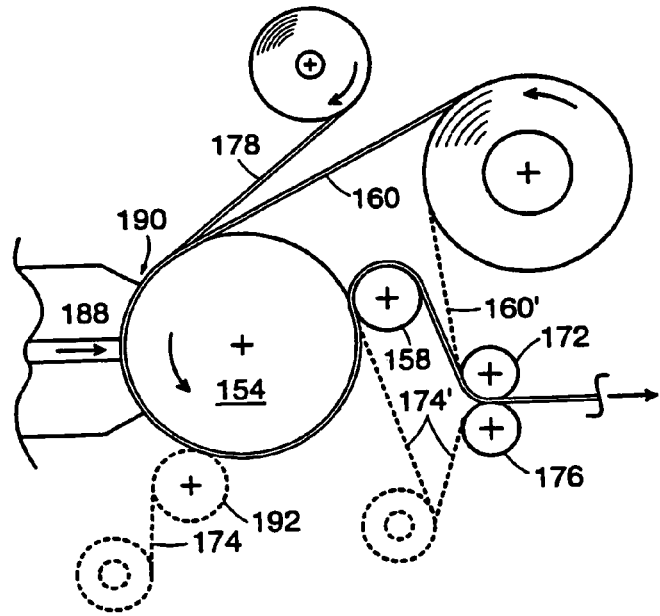
FIG. 11 illustrates a second method and apparatus for forming composite touch fastener tapes, such as the closure strips of FIGS. 1 and 6.

FIG. 11 illustrates an alternative method and apparatus for forming the above-described closure strips. The contoured surface of an extrusion head 188 (sometimes called an injection head) is placed adjacent a mold roll 154 (with fixed fastener element molding cavities as described above with respect to FIG. 7), and a continuous flow of molten resin is injected under pressure into the gap 190 defined between head 188 and mold roll 154, filling the fastener element cavities and forming the front and back faces of the substrate. The configuration and construction of mold roll 154 is the same as is shown in FIG. 8, in which member 156 may be taken to be the adjoining extrusion head. The strip 160 of loop material is fed through a predetermined region of gap 190, and held up against the surface of mold roll 154 by resin pressure in the gap. In this manner, the loop material is partially impregnated with substrate resin and permanently bonded to the front face of the substrate. In applications where it is not possible to fill the fastener element cavities without completely saturating the loop surface of the loop material with resin, a strip of barrier material 178 may be fed through gap 190 between head 188 and loop material 160. Barrier material 178 is discussed in more detail above with respect to FIG. 7. For some applications a strip 174 of paper or other suitable backing material is laminated to the back face of the substrate while the molded product is retained on mold roll 154, by pressure supplied by a pressure roll 192, as shown in dashed outline. Alternatively, a strip of adhesive-coated paper 174' may be adhered to the formed substrate either at stripping roll 158 or at idler 176.

Figure 14:
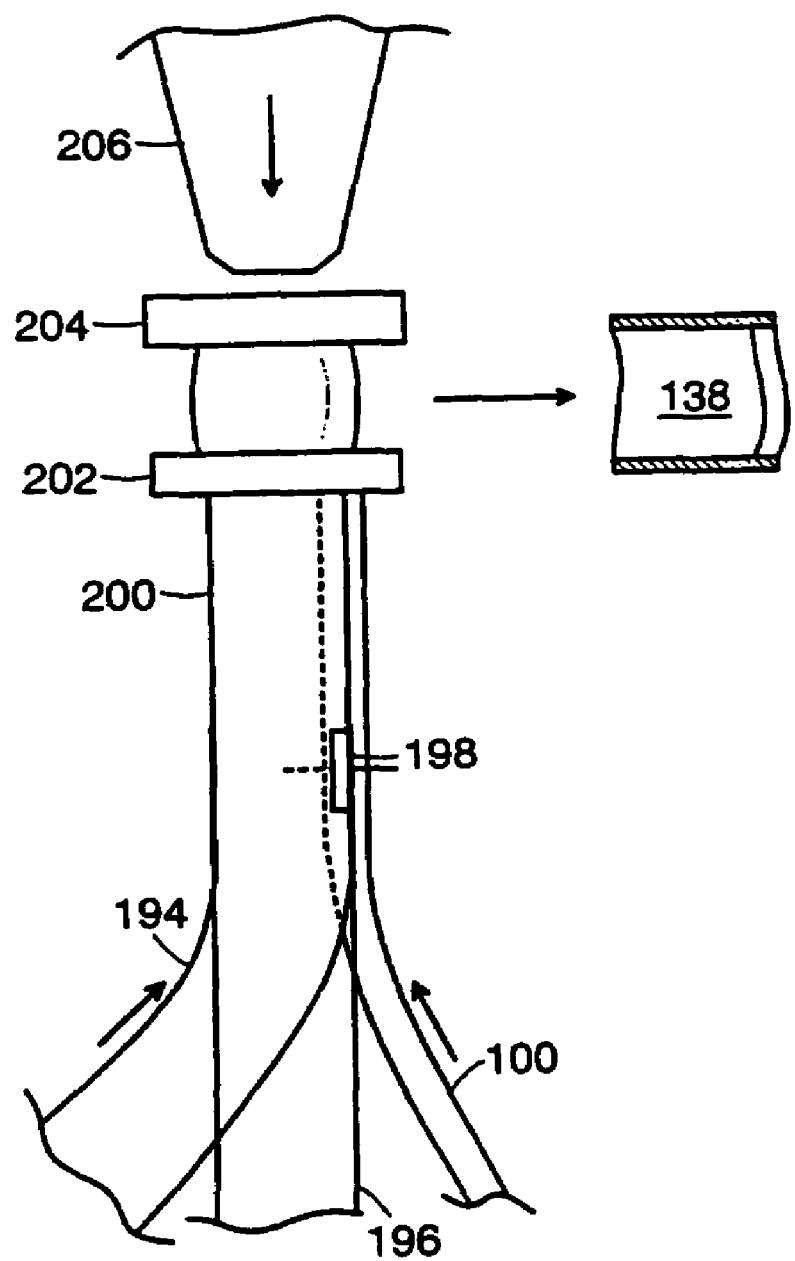
FIG. 14 illustrates a first vertical form/fill bag-making apparatus.

FIG. 14 illustrates an inverted vertical form/fill (VFF) method and apparatus for forming and filling bags (such as bag 138 of FIG. 4A). Closure strip 100 and a sheet of bag material 194 are each folded and fed about a longitudinal mandrel 196, with their edges overlapping at two points. In the embodiment shown, both the bag material 194 and the substrate of closure strip 100 are polyethylene. Two heated rollers 198 (only one visible from the perspective illustrated) weld the edges of the closure strip and bag material together to form a continuous tube 200 with two longitudinal sealed seams. In the apparatus shown, tube 200 extends upward through a lower sealing/cutting device 202 and an upper sealing device 204. In the bag forming and filling sequence, tube 200 is advanced upward until its open end is aligned with upper sealing device 204. Lower sealing/cutting device 202 then forms a transverse seal across the tube to form one sealed side of the resulting bag. The bag is then filled from above, through the still open end of the tube, with material supplied through chute 206. After a predetermined amount of material has been released into the bag, the open end of the tube is sealed by upper sealing device 204 to form a sealed bag 138, which is then severed from tube 200 by cutting the tube just below the previously formed transverse seal by lower sealing/cutting device 202. The resulting bag 138 has one edge 208 of folded bag material 194, two sealed edges 210, and one edge 212 of folded closure strip 100. Other methods of sealing closure strips to bag materials are known to those of normal skill in the art of bag making. For instance, for sealing the paper-covered surface of closure strip 100' (FIG. 6) to a paper bag material 194, a layer of adhesive would normally be applied between the overlapping paper edges of the closure strip and bag material.

FIG. 15 illustrates a modification to a more common VFF machine configuration, for continuously securing the above-described closure strip to a flow of bag-forming web during the forming and filling of individual bags. The bag-forming web consists of a thin sheet of thermoplastic film 254 which is shaped into a tube by being fed over a filling tube 256, which has an upper funnel end 258 through which contents are discharged to fall into individual bags formed of the film. Film 254 is fed from a roll (not shown) over an attitude roller 260, and guided onto the fill tube by curved guide forms 262. In some cases, the film is advanced continuously and the transverse sealing jaws 264 (described below) reciprocate vertically, traveling with the film during the sealing/cutting process (as indicated by arrows 265); in other cases the film is advanced incrementally and the transverse jaws remain within the same horizontal plane.

As film 254 is formed into a tube, its two longitudinal edges 268 form flanges extending generally radially from the tube, between which a continuous length of closure strip 266 is fed in a folded condition, such that the edge regions of the web film lie at least partially against the outer sides of the closure strip in face-to-face relation, but do not overlap the folded edge of the closure strip. Guide rollers 270 above the closure sealing bars 272 maintain the adjacency of the sides of the closure strip and the film edges. Closure strip 266 is fed over a contoured insulating rail 274 extending longitudinally along the fill tube from above guide rollers 270 to below closure sealing bars 272. As shown in FIGS. 15A and 16, insulating rail 274 has a longitudinal groove along each of its sides. One groove accommodates the loop material 104 so as to avoid crushing the extended engageable loops, and the other groove receives the hooks 106 of the closure strip, helping to guide the closure strip through the sealing process. Rail 274 also has a notch extending along its distal end, for accommodating the middle grasp rib 132 of the closure strip. The primary purpose of insulating rail 274 is to inhibit undesired welding of the inner sides of the closure strip together as the edges of the bag film are welded to the outer surfaces of the closure strip by closure sealing bars 272 (see FIG. 16). When not employing an insulating rail, the closure strip may be configured to utilize the insulating properties of the loop material to avoid permanent welding together of the inner surfaces of the closure strip, as discussed more fully below.

Closure strip 266 may either be spooled from roll 276 over guide roll 278 in a folded condition, as shown, with its hooks and loops engaged and then pulled over insulating rail 274, thus separating the hook and loop sections of the closure strip, or the closure strip may be spooled flat and then folded about the insulating rail, thereby avoiding having to disengage the hook and loop sections in the process.

Closure sealing jaws 272 each have a longitudinal groove adjacent the longitudinal grooves of insulating rail 274, such that the heated sealing jaws slidingly contact the film edge regions only on either side of the hook and loop bands of the closure strip, sealing the film to the closure strip in two discrete bands on each side of the closure strip. Sealing jaws 272 have appropriate heating elements embedded within them (not shown) to maintain the sealing surfaces at a predetermined, elevated temperature. To leave the inner edge of the loop side of the closure strip free from the film to form an anti-peel flap (as discussed above with respect to FIGS. 2A and 2B), the sealing jaw 272 on the loop side of the closure is at least partially recessed, as shown, to avoid bonding the inner edge of the loop side of the closure strip to the bag film. To form an even wider anti-peel flap, the sealing jaw 272 on the loop side of the closure may be configured to contact the bag film only outboard of the band of loop material 104.

Immediately below the lower edges of sealing jaws 272, insulating rail 274 terminates and the hook and loop bands of the closure strip are pressed together between a pair of rollers 280, just above the lower end of fill tube 256.

After a selected amount of contents have discharged through the lower end of the fill tube, transverse sealing jaws 264 come together about the bag film and closure strip and form is two parallel, transverse seals 284, each of which will form the sealed edge of a bag. As jaws 264 travel with the advancing film, a cutting knife 282 within the jaws severs the film and closure strip between the transverse seals 284. When jaws 264 open at the end of the sealing cycle, a fully formed, filled and severed bag 286 is complete.

Figure 16A:
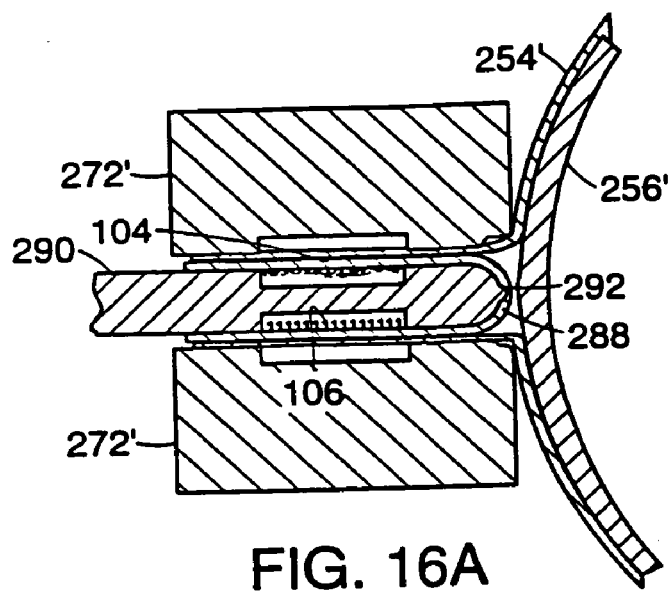
FIG. 16A is a cross-sectional view, corresponding to FIG. 16, with an inverted closure strip arrangement.

FIG. 16A shows another configuration of sealing a closure strip 288 to edge regions of a film web 254 as the film web is fed about a fill tube 256, for creating what we call an inverted closure having free outer edges and a recessed center portion. In this configuration the closure strip is guided over a separate insulating rail 290 that extends between the film edges and the opposing sides of the closure strip, similar in cross-section to the insulating rail of FIG. 16 but in opposite orientation. In this case closure strip 288 is provided with a center tear notch 292, rather than a center rib, along which the closure is burst to initially open the bag. In the bag formed with this style closure, the hook and loop elements are not exposed to the bag contents prior to the initial opening, and the center portion of the closure strip provides a tamper-evident seal. Closure strip 288 is permanently sealed to the bag film by heated sealing jaws 272' which are similar in construction to sealing jaws 272 of FIG. 16.

Figure 17:
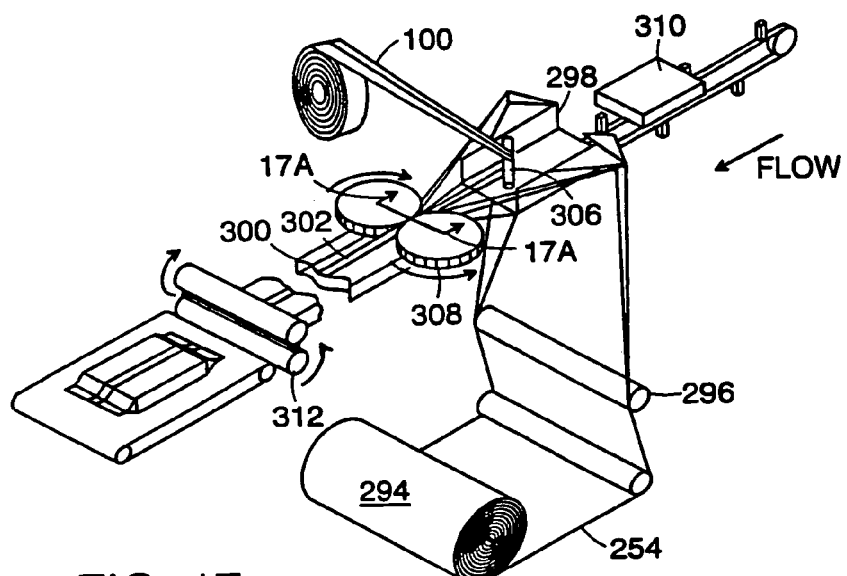
FIG. 17 shows a first inverted horizontal form/fill packaging apparatus and method, with the closure strip fed into the fin seal between the web flanges.
Figure 18:
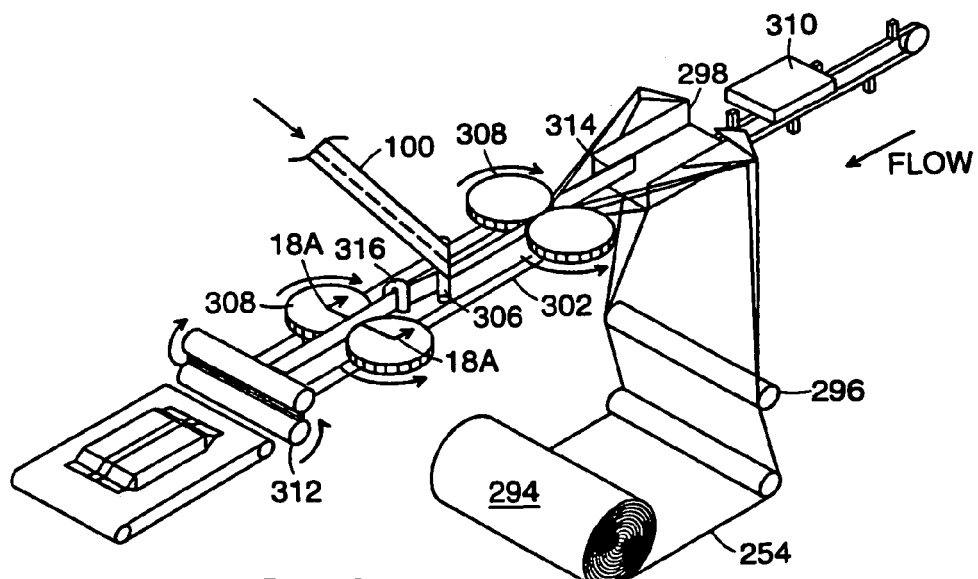
FIG. 18 shows a second inverted horizontal form/fill packaging configuration, with the closure strip wrapped about the web flanges.
Figure 19:
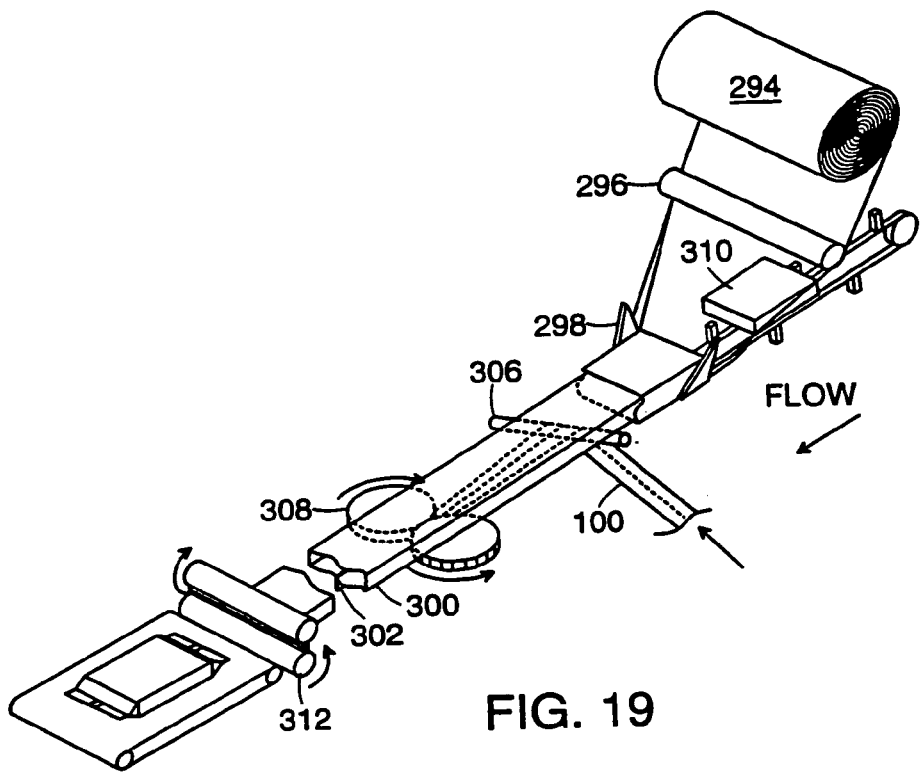
FIG. 19 shows a third horizontal form/fill packaging method, with the fin seal formed on the underside of the packages.

FIGS. 17-19 illustrate three examples of horizontal form/fill (HFF) machines and processes featuring the above-described closure strips. Referring first to FIG. 17, a bag film 254 is continuously fed from roll 294 over attitude roller 296 and into a forming head 298 shaped to form the film into a rectangular tube 300. As with the VFF method described above, the edges of the film are brought together to form a perpendicular fin 302 extending from one side of the tube. In this case, closure strip 100 is fed from roll 304, folded to engage the hook and loop bands, passed about angled roller 306, and fed into the nip between heated fin seal rollers 308 between the edges of the bag film. Meanwhile individual products 310 to be packaged (e.g., trays of cookies) are fed through the forming head and into film tube 300 at a predetermined spacing and rate corresponding to the speed of the bag film.

Figure 17A:
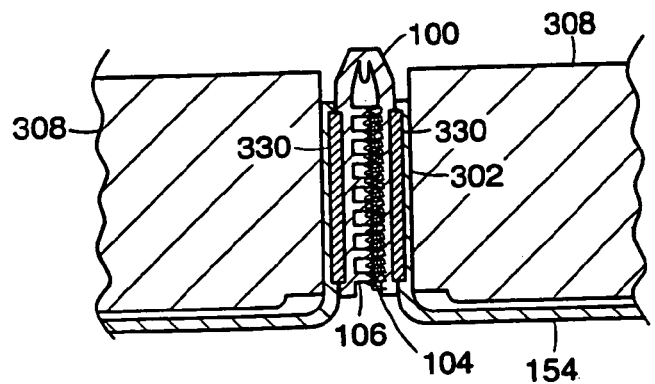
FIG. 17A is a cross-sectional view, taken along line 17A-17A of FIG. 17.

As shown in FIG. 17A, the outer surfaces of folded closure strip 100 are permanently welded to the extending film flanges forming the perpendicular fin 302 of the film tube in the nip between fin seal rollers 308. No insulating rail is needed between the inner surfaces of the closure strip in this case because the air between the hooks and loops extending from the inner surfaces of the closure strip prevents extensive welding inside the closure strip. With proper adjustment of the temperature and pressure of rollers 308, which depends on the type of resin employed and the line speed, among other things, at most only a small fraction of the heads of hook elements in hook band 106 will be lightly bonded to either loop material 104 or the resin in which the loop material is embedded. This small amount of bonding will advantageously increase the amount of peel force required to initially open the package, leaving a sufficient proportion of undamaged hook elements to provide adequate engagement upon reclosure. We note that with many hook and loop resins, speeds, temperatures and pressures will have to be carefully adjusted and controlled to provide a light bond while avoiding rapid progression of hook melting.

Referring back to FIG. 17, diagonal offset folding rollers (not shown) fold over the fin seal, and a pair of offset rollers 312 carrying a heated seal bar and cutting blade seal the ends of the bags and sever the bags from each other.

Figure 18A:
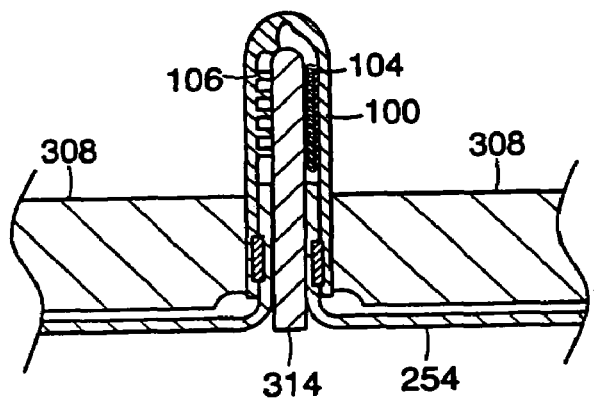
FIG. 18A is a cross-sectional view, taken along line 18A-18A of FIG. 18.

FIG. 18 shows a similar HFF process, in which the closure strip 100 is folded over on the outside of both the bag film flanges and a fin seal insulating rail 314 that extends to just downstream of heated fin sealing rollers 308. Passed around angled roller 306, closure strip 100 is folded within a guide channel 316 such that the edges of the closure strip overlap the edges of the bag film, as shown in FIG. 18A. These overlapped regions are welded together on either side of insulating rail 314 by the fin sealing rollers, permanently bonding the closure strip to the bag film. As the fin seal is folded over before passing between offset rollers 312, the hook and loop bands of the closure strip are pressed together, before the inner surfaces of the bag film flanges are welded together at the end seals of the bag. The hook and loop bands may also be welded together at the end seals, if desired, by providing sufficient heat, pressure and dwell time of the portion of the heated sealing bar of the offset rollers that contacts the closure strip at the hook/loop interface.

FIG. 19 illustrates the incorporation of a reclosable closure strip into a more common HFF machine configuration, with the longitudinal fin seal 302 formed on the bottom side of the rectangular film tube 300. As in FIG. 18, closure strip 100 is folded about the outside of the extended film edge flanges, which are separated by an insulating rail (not shown) that extends through the nip between the fin sealing rollers 308.

FIG. 20 shows another application of our closure strip in a bag-making process. Closure strip 318 is differs from the closure strip shown in FIG. 1 only in that in contains a pull cord 320 (FIG. 22) embedded along its central rib 132. The pull cord is configured to tear through the closure strip and bag film longitudinally between the hook and loop bands when pulled transverse to the closure strip, and therefore must be of sufficient tensile strength to tear through the closure strip resin without breaking. Suitable pull cord materials include drawn nylons, such as fishing line, for example. The pull cord is embedded within the resin of the center closure strip rib by being continuously fed into the rib-forming channel 322 of the mold roll (FIG. 8) prior to the introduction of the rib-forming resin (such as long the feed path labeled 178 in FIGS. 7 or 11). Appropriate guides (not shown) are recommended to keep the pull cord from walking out of the rib-forming channel.

Closure strip 318 is passed around a guide roller 324 to travel with bag film 254 onto a folding collar 326 where it is permanently bonded to the film under heat and pressure by a sealing shoe 328. As shown in FIG. 21, sealing shoe 328 slidingly engages the closure strip along three bands, forming three continuous welds 330 between the closure strip and bag film 254. Collar 326 supports the bag film against the light pressure applied by the sealing shoe. The channels 332 and 334 in the sealing shoe accommodate the hook band 106 and center rib 132 of the closure strip, accordingly, and maintain the transverse location of the closure strip during bonding. The outer edge of the loop side of the closure strip is not welded to the bag film in this instance, to provide an internal anti-peel flap in the finished bag, as shown in FIG. 22. Other bonding configurations are employed for various applications.

Once welded together, bag film 254 and closure strip 318 are folded along their longitudinal centerline and passed between two drive rollers 336 that press the hook and loop bands of the closure strip together and ensure an appropriate crease along the spine of the closure strip. The folding of the bag film and closure strip is effected by collar 326 and a creasing idler 338 that runs along the center of the closure strip and defines a rim groove 340 for receiving the center rib of the closure strip during folding.

The folded bag film next passes between a pair of reciprocating sealing/cutting jaws 342 which close against the outer surfaces of the bag film to seal the two sides of the folded bag film and the folded closure strip together to form a series of individual pouches, each pouch sealed on three sides and having a single open end 344 for subsequent filling. Jaws 342 may be configured to also sever the pouches from each other during sealing, or to leave the pouches connected in the form of a string of pouches that is readily pulled through an adjacent filling/closing station (not shown).

FIG. 23 gives one example of a pouch side seal configuration formed by the jaws 342 of FIG. 20, in which a slot 346 and notch 348 are die-cut within the vertical seal formed between adjacent pouches. The heated faces of jaws 342 form complementary die parts for cutting through the bag film and closure strip to form the configuration shown as the inter-pouch seal is formed. The pouches are then filled through their open ends, which are subsequently sealed closed. By severing the lower segments 350 joining adjacent pouches along centerlines 352, extended pull tabs 354 are formed at the edges of each pouch. Each pull tab 354 contains an end portion of pull cord 320, and provides convenient means for grasping and pulling the pull cord through the closure strip along the pouch, as shown in FIG. 24.

Figure 25:
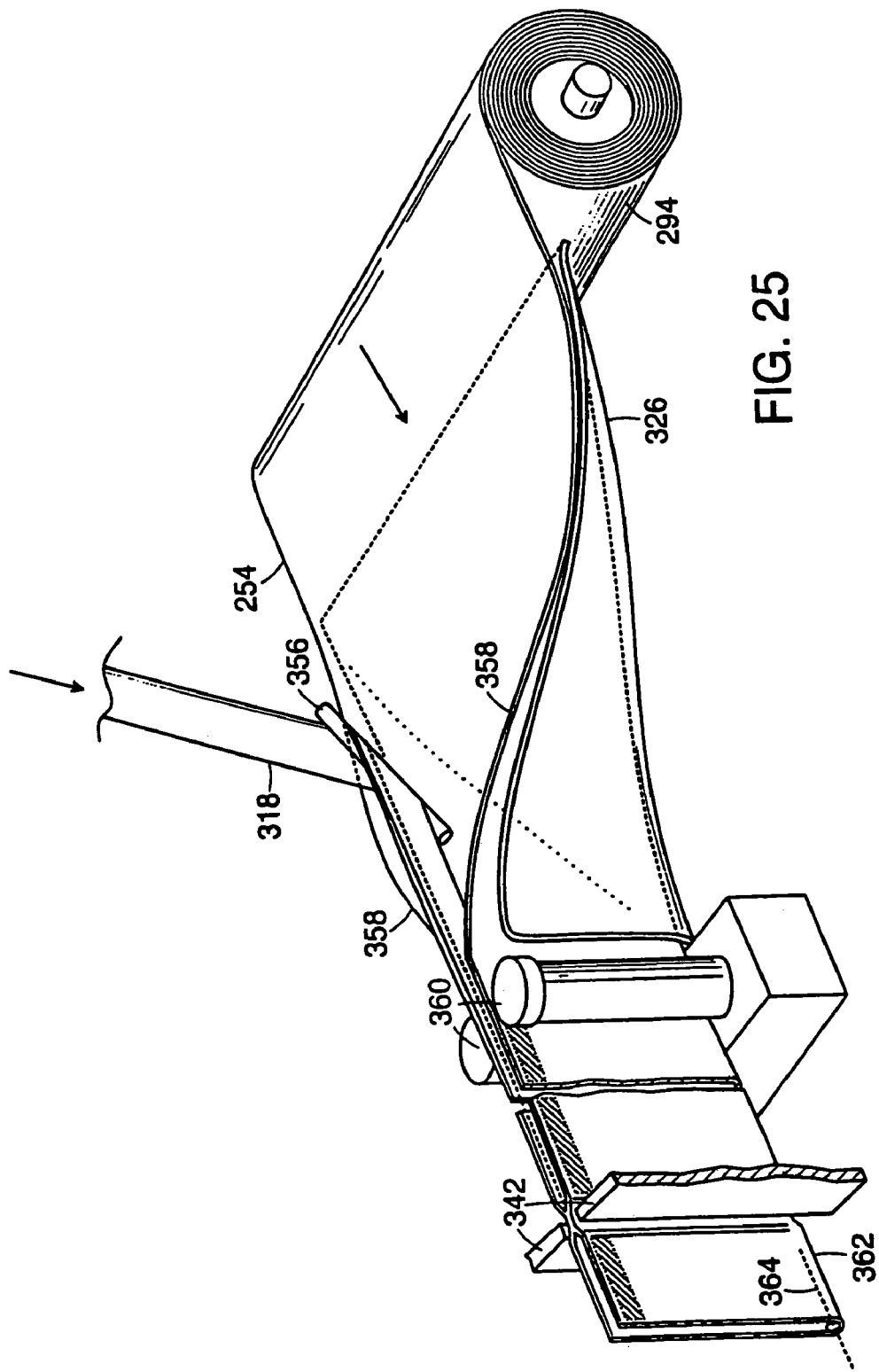
FIG. 25 shows another method for forming pouches, in which the closure strip is bonded to the edges of a sheet of bag film as the film is folded.

In the bag-forming method shown in FIG. 25, closure strip 318, already folded in half, is fed across an angled roller 356 and between the longitudinal edges 358 of bag film 254 as the film is folded within collar 326. A pair of heated sealing rollers 360 continuously seals the edge regions of the bag film to the overlapping closure strip. No insulating rail is necessary as the loop material of the closure strip, which in this case is sufficiently wide to extend across the entire sealing region, inhibits the bonding of the opposing inner surfaces of the closure strip (as discussed further below with respect to FIGS. 36 and 37). After passing through edge sealing jaws 342, the folded edge 362 of the bag film is trimmed away along line 364, leaving the ends of the pouches opposite the closure strip open for receiving materials to be packaged. The series of pouches may then be spooled into a roll for sale or later filling.

Figure 26:
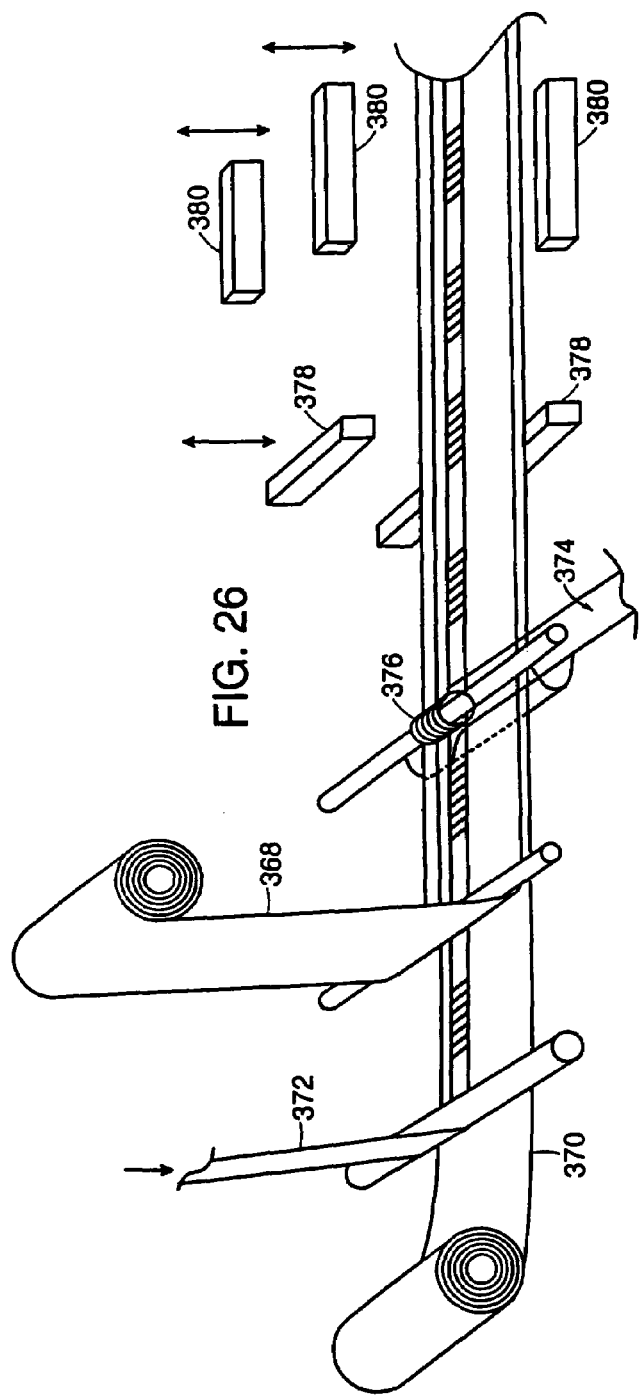
FIG. 26 illustrates making reclosable bags from two parallel plastic webs and a closure strip.

FIG. 26 shows a method of making bags from two separate sheets of bag film and the above-described bag closure strip. Upper and lower plastic films 368 and 370, respectively, are unspooled continuously, with either a pre-folded closure strip, or pre-engaged hook and loop strips 372, fed between them as shown. An insulating rail 374 extends between the hook and loop strips, temporarily disengaging the hooks from the loops, as the hook and loop strips are each permanently welded to respective inner sides of the plastic films between two rotary sealing rolls 376 (only the upper roll is shown). The parallel films and fastener strips are then welded together at spaced intervals by transverse heated sealing jaws 378, forming side seals between adjacent bags which are then filled from their open ends (not shown) and closed by upper and lower sets of sealing jaws 380. This process is also useful, for instance, for forming a series of pre-made bags to be rolled or stacked for later filling.

Figure 26A:
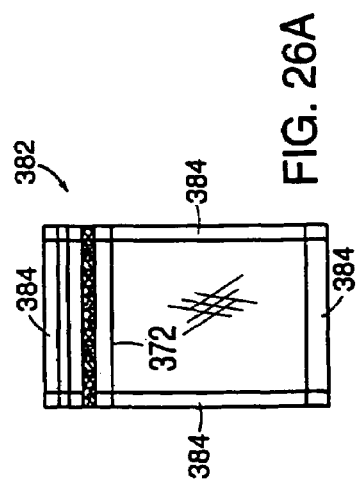
FIG. 26A shows a bag made by the process of FIG. 26.

The bag 382 formed by this process has four side seals 384, as shown in FIG. 26A, along with closure 372. The side seal 384 adjacent and parallel to closure 372 is ripped off to open the bag and expose the closure. In another embodiment (not shown) the side seal 384 adjacent and parallel to closure 372 is omitted, along with the upper set of sealing jaws 380 in FIG. 26, and a folded closure strip (e.g., strip 318 of FIG. 25) is inserted in place of separate strips 372, with the fold of the closure strip pointing outward toward the adjacent side of the continuous films. In another embodiment, producing an "inverted" closure arrangement similar to that shown in FIG. 36, the folded closure strip is fed between the plastic films with its fold extending away from the adjacent edge of the films.

Figure 27:
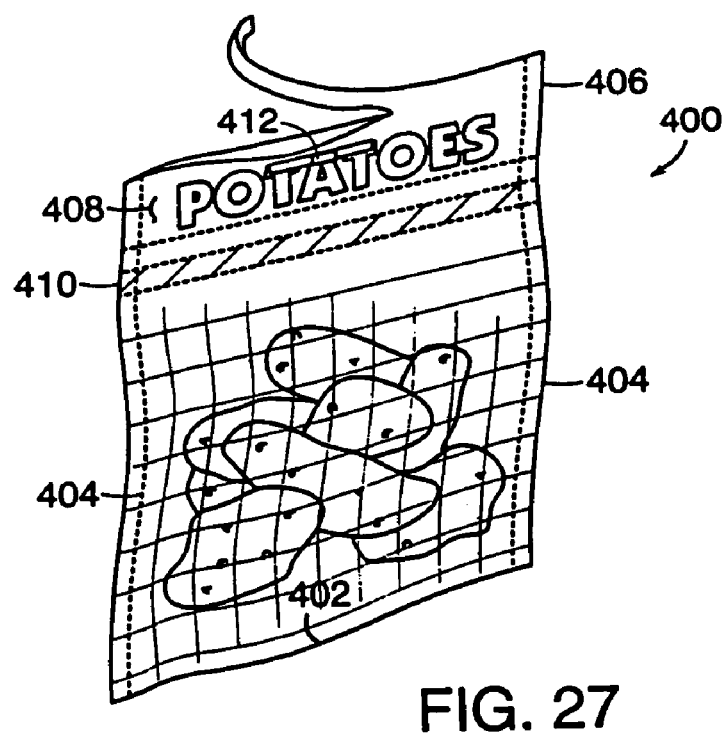
FIG. 27 shows a package having a broad closure strip displaying consumer information.

The closure strip also provides, in some instances, a broad, external bag surface for carrying text, logos or other marketing indicia. In FIG. 27, a produce bag 400 is formed generally of loosely woven plastic mesh to provide unobstructed air circulation and a clear view of the quality of the enclosed produce. The plastic mesh is formed into a bag with a fold at the bottom edge 402 and is either sewn or thermally fused along its two sides 404, one of which may remain open until the contents are inserted. A wide closure strip 406 sewn or welded to the plastic bag mesh at the upper end of the bag provides a solid surface 408 printed with appropriate marketing indicia and information, which may be applied to the closure strip either before or after it is attached to the plastic mesh forming the rest of the bag. In other instances, the broad outer face of the closure strip provides a support for securing adhesive labels (not shown) printed with such information. In the example shown, the closure strip is thermally welded to the plastic mesh in regions 410 (while an insulating rail, not shown, is disposed between the inner closure strip surfaces to prevent permanent bonding between the sides of the closure strip, as discussed above). For convenient handling, a C-shaped slit 412 is cut through both sides of the closure strip outboard of its hook and loop bands, to form a carrying handle. In other applications, air circulation holes may be provided through the closure strip sides, as necessary.

Figure 28:
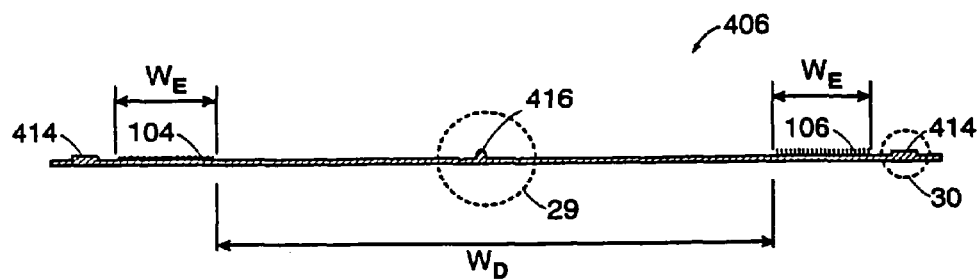
FIG. 28 is a transverse cross-section through the closure strip included in the package of FIG. 27.

As shown in FIG. 28, closure strip 406 is of similar construction to the closure strip of FIG. 1, but with some modification. Notably, the overall width of closure strip 406 is about 6.2 inches, with a fastener band separation distance $W_D$ of about 3.9 inches, providing sufficient width for printing with the closure edges either outboard or inboard of the plastic bag mesh. The width $W_E$ of both the hook and loop bands 106 and 104, respectively, is about 0.75 inch, with ⅜ inch wide outer edge regions having thickened weld zones 414.

Figure 29:
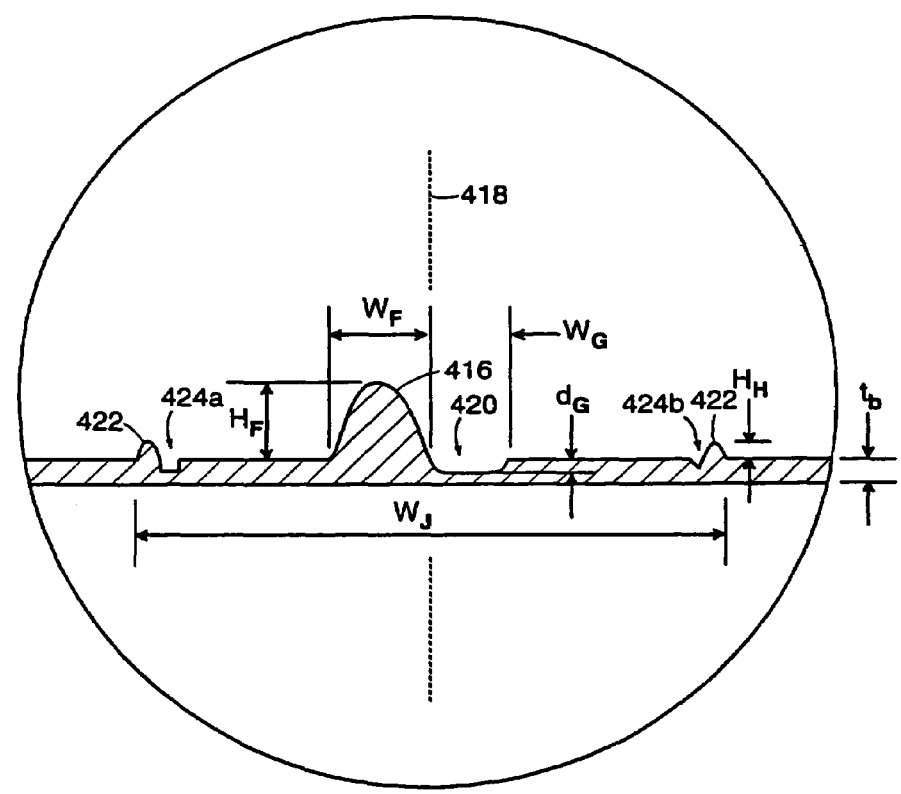
FIGS. 29 and 30 are enlarged views of areas 29 and 30, respectively, in FIG. 28.

The detail of the center features of the closure strip is shown in FIG. 29. Grasping rib 416 is offset slightly from the centerline 418 (i.e., the midline between the hook and loop bands), such that when the closure strip is folded, the grasping rib will be biased to lie on a predetermined side of the fold, avoiding variability in hook/loop band alignment caused by the fold line fluctuating between the two sides of the rib. Rib 416 has both a width $W_F$ and a height $H_F$ of about 1/32 inch, and is immediately adjacent a shallow groove 420 extending along the length of the closure strip, of a width $W_G$ of about 1/32 inch and a depth, $d_G$, of about 0.002 inch. Groove 420 provides some space for rib 416 with the closure folded at centerline 418. Spaced apart from the rib and groove are tear control features. These include a continuous rip-stop rib 422 of height $H_H$ of about 0.002 inch immediately outboard of a continuous tear-propagation groove. Two preferred tear-propagation groove profiles are shown. On the left of FIG. 29, groove 424a is of square profile with sharp bottom corners for concentrating stress during tearing. On the right of FIG. 29, groove 424b is of triangular profile with a single, acute corner at its center for concentrating stress. For reasons explained above, to form this pattern of features the mold roll is preferably equipped with a single plate or ring of width $W_P$, having a contoured outer surface for forming all of the features shown. The nominal thickness of the closure base, $t_b$, is about 0.006 inch in this instance, but for different applications will be selected between about 0.004 and 0.030 inch.

As shown in FIG. 30, the thickened weld zones 414 near the edges of the closure strip extend a distance $d_w$ of about 0.012 inch from the base of the closure strip (giving these areas, which have a width $W_K$ of about 0.120 inch, an overall thickness of about 0.018 inch). Without adjusting the profile of the extrusion die or otherwise varying the amount of entering resin along the length of the nip as the closure strip is formed, the practical maximum thickness and width of weld zones 414 will depend on the flow properties of the resin as well as the pressures and temperatures involved. Thickening the closure strip in the areas intended to be welded to other bag materials provides more resin available for flow and bonding during welding. In addition, the greater closure strip mass absorbs more heat and helps to keep the inside surfaces of the closure strip base from being welded together. Thicker materials are also less sensitive to fluctuations in welding conditions, enabling more consistent bonding.

For some applications, the closure strip provides loop-engageable hook elements on the outer surface of the bag, such as for attaching the packaged product to a display or other support surface. For example, FIG. 31 shows a closure strip 426 at the upper end of a bag 428, having a band 430 of molded hook fastener elements extending from its outer surface and exposed for engaging loop fibers. The closure strip may include a grasping rib 132 as shown, and be configured to tear above band 430, such that the outer hooks remain on the opened bag. Alternatively, the closure strip may be configured to tear between band 430 and the top edge of the bag film, in which case the grasping rib may be unnecessary. The hooks of band 430 are useful, for instance, for hanging bag 428 from a display rack covered with loop material. For stringing multiple bags together, a mating band of loops (not shown) may be provided elsewhere on the outer surface of the bag, such that band 430 of each bag engages the exposed loop band of an adjacent bag of the string. FIG. 31 also illustrates an example of the weld-insulating loop material arrangement discussed below with respect to FIGS. 36 and 37.

Optionally, closure strip 426 may include an outer band 432 of loop material, extending from a side of the bag opposite the exposed band 430 of hooks, for securing bags together in a stack. In another embodiment (not shown), the closure strip has an exposed band 432 of loops, but no exposed band 430 of hooks, and is hung thereby from a display rack having extending hook elements.

FIG. 32 shows a machine arrangement for producing closure strip 426 of FIG. 31. A first resin 434 is extruded into a nip between a hook-forming mold roll 154 and a smooth pressure roll 156, along with loop material 104 to form the primary loop band of the closure and, optionally, loop material 432 to form the secondary (i.e., outer) loop band of the closure. The cooling resin travels with the mold roll to a second nip between roll 154 and a secondary hook-forming mold roll 436, where it is joined by a second flow of resin from extruder 438. The flow of resin from extruder 438 is much narrower than the resin traveling on roll 154, and is only applied in specific strips corresponding to the secondary (i.e., outer) hook bands formed on the closure strip. The resin from extruder 438 is forced into hook-forming cavities in roll 436 by nip pressure, and cools as the closure strip travels on the surface of roll 436 until the secondary hooks are pulled from their cavities at roll 440. Thus, the primary hook band 106 and the secondary hook band 430 are formed by rolls 154 and 436, respectively, and are, in some applications, formed of different resins. As will be readily understood from this example, other machine configurations will produce similar products. For example, the upstream mold roll may be employed to mold the secondary hooks and closure base, with the downstream mold roll (i.e., the upper mold roll in FIG. 32) forming the primary hooks. In such case, the primary loop material 104 would preferably be introduced against roll 156.

Referring now to FIGS. 33 and 34A, pouch 442 includes a closure strip 444 sealed along its two edges to bag film 446 with welds 330. Along its lower edge, the closure strip is welded on its outer face; at its upper edge it is welded on its inner face. In the illustrated embodiment, closure 444 differs from the closure 100 of FIG. 1 in that its tear rib 132 extends from the face opposite the face on which its loop and hook bands 104 and 106, respectively, are carried. Additionally, rib 132 contains a pull cord 320 as described above with respect to FIGS. 22-24. Rib 132 is formed in a corresponding groove in the pressure roll opposite the hook-forming mold roll in a Fischer-type process, with pull cord 320 introduced to the resin of the closure strip in the groove. Located on the inside face of the pouch as shown, pull cord 320 of rib 132 is torn through the entire thickness of the closure strip base as it is pulled outward (in the direction of arrow "G" in FIG. 34A) to open the pouch. Alternatively, rib 132 may be located on the same side of the closure strip as the hook and loop bands (as in strip 100 of FIG. 1), with appropriate tear features extending along either side of the rib to facilitate tearing of the closure strip, even without an embedded pull cord 320. In yet another embodiment (not shown), pull cord 320 is simply disposed at the inner face of the closure strip (without an enclosing base thickening or rib) and is pulled through the base in the direction of arrow "G" to open the pouch. Such a configuration is produced by introducing the pull cord to the resin in the molding nip in a Fischer-type process, on the pressure roll side of the resin, without a rib-forming groove in the pressure roll.

Figure 34B:
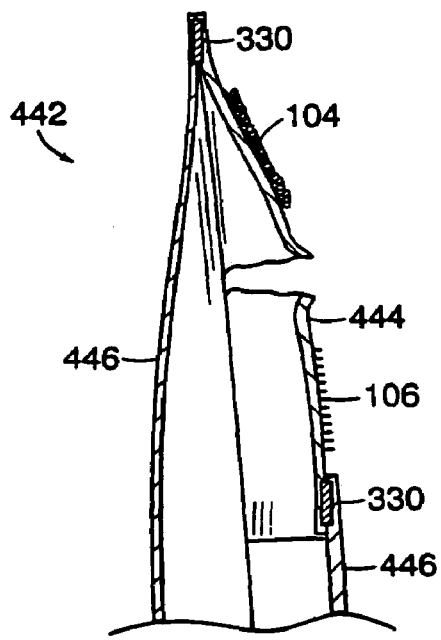
FIGS. 34B and 34C sequentially illustrate the opening and reclosing of the pouch of FIG. 34A.

As shown in FIG. 33, a c-shaped pull tab 448 is formed at one edge of the pouch by die cutting the outline of the pull tab through the rib 132 and base of the closure strip 444 within a non-sealed region 450 within the side seal 452 of the pouch, without cutting through the bag film behind the closure strip. Because the closure strip is not bonded to the bag film (forming the back side of the pouch) within region 450, the cut pull tab is free to be grasped and pulled across the face of the pouch between the hook and loop bands of the closure strip, opening the pouch as shown in FIG. 34B. Alternatively, a hole may be provided through the layer of bag film at 450, thereby leaving tab 448 exposed for grasping. Lettering 454 is shown in FIG. 33, printed on the exposed face of the closure strip to indicate the location of the pull tab. As an alternate means of exposing the pull cord to be grasped, in another embodiment (not shown) a narrow width of closure strip 444 containing pull cord 320 is left extending beyond the edge of the bag film, exposed to be pulled through side seal 452 and across the face of the pouch. Seal 452 may be configured as a peelable weld if necessary to enable the grasping rib or pull cord to be pulled through the seal without breaking.

Figure 34C:
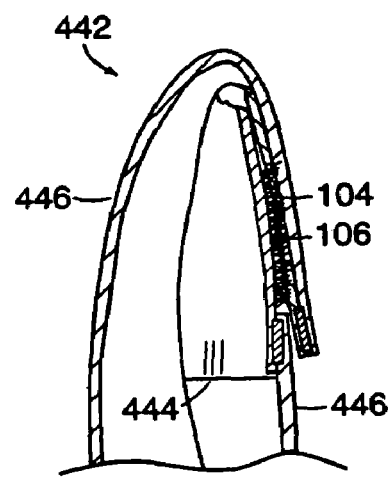

After being opened, pouch 442 may be closed by folding over the upper edge of the pouch such that the hook and loop bands 106 and 104 of the closure strip 444 overlap and engage, as shown in FIG. 34C. Re-opening the pouch entails simply disengaging the touch fastening and unfolding the pouch top.

To form pouch 442, closure strip 444 is first sealed along what will become its lower edge to one edge of a continuous sheet of bag film. The closure/film combination then proceeds through the pouch-forming process known in the art, in place of the bag film alone. As a final step before adjacent pouches are severed from one another, the pouches are filled through their upper ends before the upper weld 330 is formed between the closure strip and the bag film, to seal the pouch. Also note that this closure strip arrangement has the advantage that the loop and hook bands 104 and 106 of the closure strip do not generally come into contact with the pouch contents, making such an arrangement particularly applicable to pouches containing fibrous or similar materials which may become embedded in the hook or loop bands and decrease the effectiveness or cosmetic appeal of the closure over time. In another sequence, not illustrated, the closure strip is sealed to the film after the bag film is center-folded.

Figure 35A:
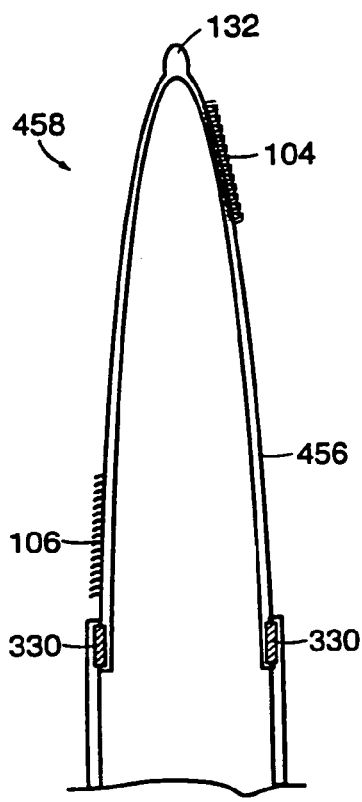
FIG. 35A is a cross-sectional view through the closure end of a roll-top bag.
Figure 35B:
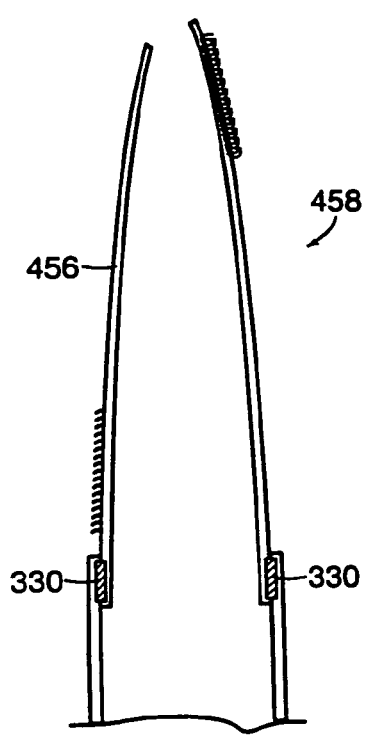
FIGS. 35B through 35D sequentially illustrate the opening and reclosing of the bag of FIG. 35A.
Figure 35C:
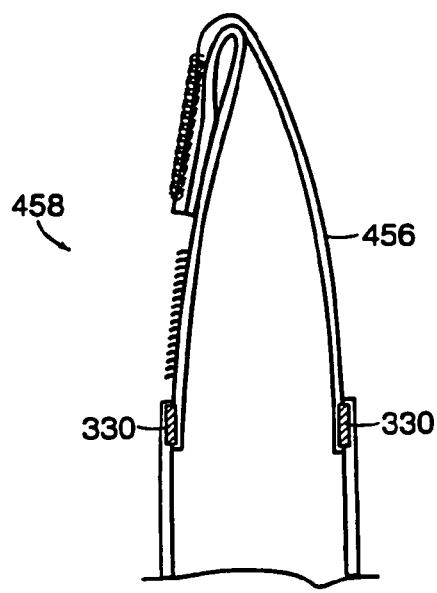
Figure 35D:
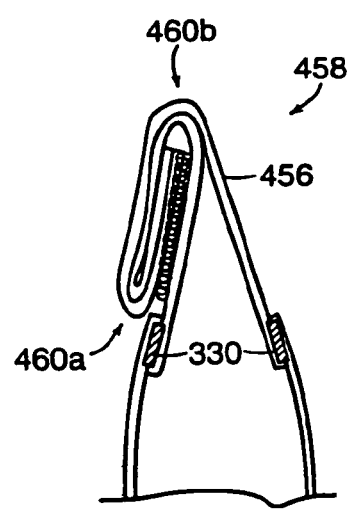

The closure strip is configured, in some cases, to be folded over upon itself multiple times after opening to form a substantially water-tight seal. For example, the closure strip 456 of home dry-cleaning bag 458 of FIGS. 35A-35D is of sufficient width, as compared to the placement of its loop and hook bands 104 and 106, so as to be readily folded over twice after opening, to engage the hook and loop bands to form a releasable closure (FIG. 35D). As with the embodiment of FIG. 33, the hook and loop bands of the closure remain separated from the bag contents as they are carried on the outside of the bag. To effect the overlap of the hook and loop bands when the bag top is folded over twice, the loop band 104 is disposed much closer to the grasping rib 132 at the upper edge of the bag than is the hook band 106. The appropriate relative dimensions required to effect such an overlap will be apparent from the sequential illustration of FIGS. 35B-35D. As the two separated sides of closure strip 456 are folded over together twice, two distinct folds 460a and 460b are formed. The ability of these folds to form a seal against gas or liquid penetration will depend upon the tightness of the folds and the viscosity of the fluid to be sealed, among other things, but such folds will form effective seals for many applications, such as in bags for home dry-cleaning kits as described in U.S. Pat. No. 5,238,587, the contents of which are incorporated herein by reference. For such applications in which the bag does not have to remain sealed prior to use, the upper edge of the bag containing rib 132 may be severed from the bag during bag production, such that the bag is sold in an open condition as in FIG. 35B. As another alternative, the closure strip may be in the form of two separate strips, a hook strip and a loop strip, each strip forming one side of the closure and being separately welded to the bag film.

Figure 36:
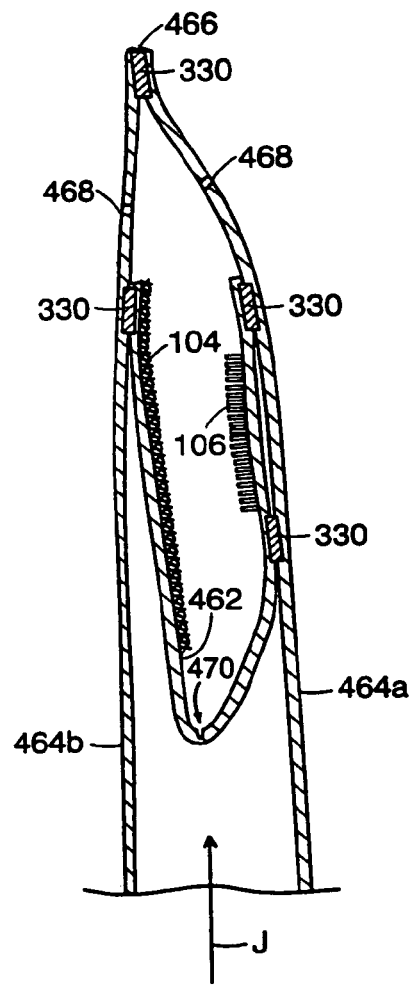
FIG. 36 is a cross-sectional view through the closure end of a bag with an inverted closure.

For some applications, the bag closure is welded between two separate film sheets to form a bag. FIG. 36 shows one such bag closure 462 welded to bag side sheets 464a and 464b, forming what we call an "inverted" closure. The side sheets of the bag extend beyond the closure strip and are themselves welded together to form the upper edge 466 of the bag. After the closure strip has been bonded to the bag sides, and the side edges of the bag sealed (not shown) the bag is filled from its other end, in the direction of arrow "J", which is then sealed to close the bag. To initially open the bag, edge 466 is pulled, tearing the bag side sheets along perforations 468. Next, the closure strip is forced open and the closure strip web is pulled in two along a tear groove 470 at the closure strip fold. To reclose the bag, the loop and hook bands 104 and 106 of the closure strip are simply pressed together.

Figure 37:
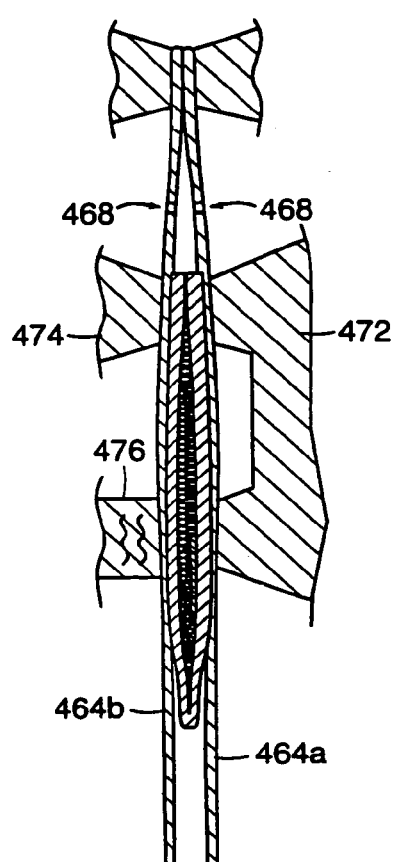
FIG. 37 illustrates a method and device for attaching the closure strip to the bag of FIG. 36.

The welding pattern shown in FIG. 36 provides the anti-peel advantages discussed above, as the inner edge of the loop side of the closure strip remains unbonded to bag side sheet 464b. One method of forming such a weld pattern is shown in FIG. 37, in which closure strip 462 is simultaneously welded to both bag side sheets 464a and 464b by heated jaws 472 and 474, respectively. Advantageously, loop material 104 is arranged on the folded closure strip to overlap both inner and outer closure strip weld zones, inhibiting any permanent welding together of the sides of the closure strip. For applications in which a small amount of bonding between the inner faces of the closure strip is acceptable (or desirable), a chilled jaw 476 against the loop side of the bag adjacent the inner weld zone prevents any undesirable bonding of the inner edge of the loop side of the closure to bag side sheet 464b.

Figure 38A:
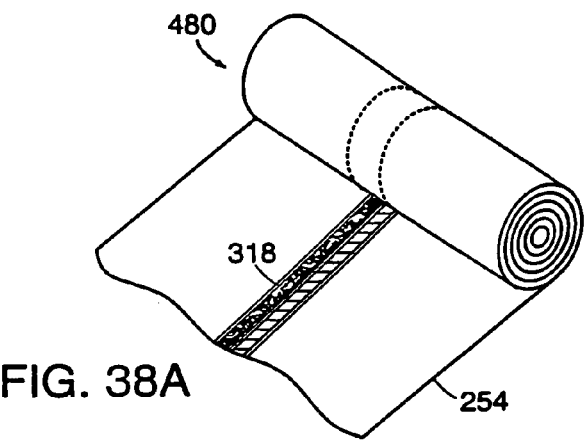
FIGS. 38A-38C show rolled bag films with pre-applied closures, in various configurations.
Figure 38B:
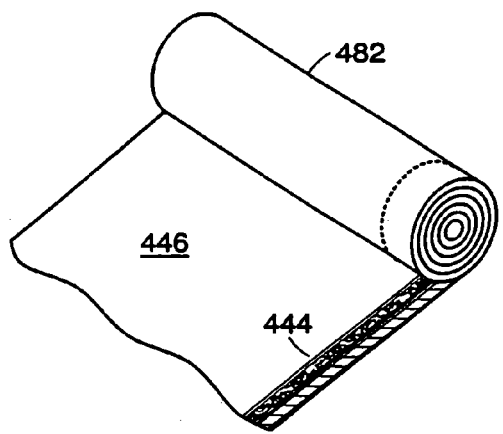
Figure 38C:
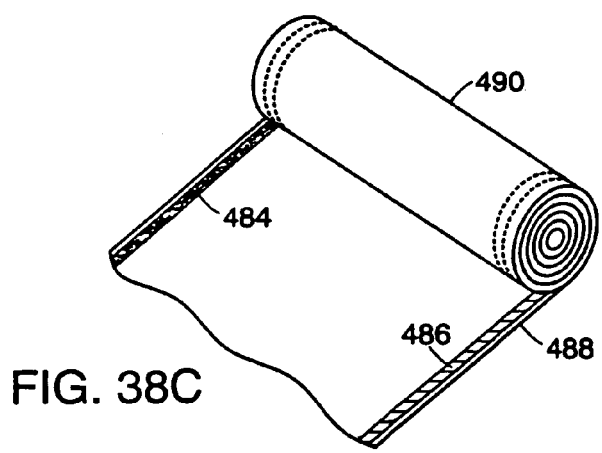

As an alternative to applying the closure strip to the bag film as the bag film is formed into bags, the closure strip may be pre-applied to the bag film, and both spooled together into rolls. Such configurations are particularly useful in the subsequent formation of bags on standard bag-making machines not equipped for the application of closure strips. For example, FIGS. 38A through 38C show spooled or rolled film products consisting of a continuous sheet of thin plastic film permanently bonded to one or more continuous lengths of closure products. In FIG. 38A, closure strip 318 is centered upon the bag film 254, such as for forming bags with the process illustrated in FIG. 20. In FIG. 38B, closure strip 444 is sealed along one edge of bag film 446 to form rolled product 482, such as for forming pouch 442 of FIG. 33. In FIG. 38C, separate lengths of hook and loop products 484 and 486, respectively, are bonded to opposite edges of film 488 to form rolled product 490, which may be run through standard form/fill processes to incorporate resealable closures into longitudinal fin seals.

Figure 39:
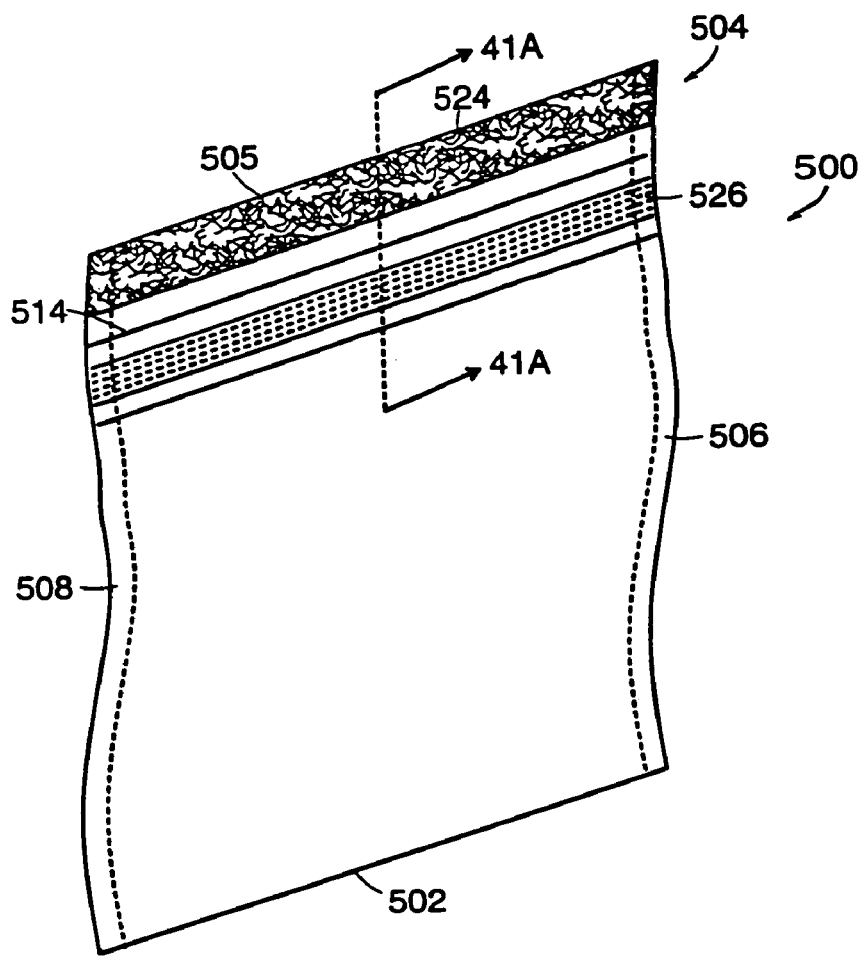
FIG. 39 is a perspective view of a reclosable bag.

Referring to FIG. 39, bag 500 consists of a piece of polyethylene bag material folded once to form the bottom edge 502 of the bag, joined to a closure 504 to form the upper edge 505 of the bag, and permanently sealed along the remaining two sides 506 and 508 by welding the material of the front face of the bag to the material of the back face of the bag. Although illustrated as a flat bag, bag 500 may be constructed in other forms, such as a pouch with a lower pleated end for standing the pouch upright on its lower edge.

Figure 40:
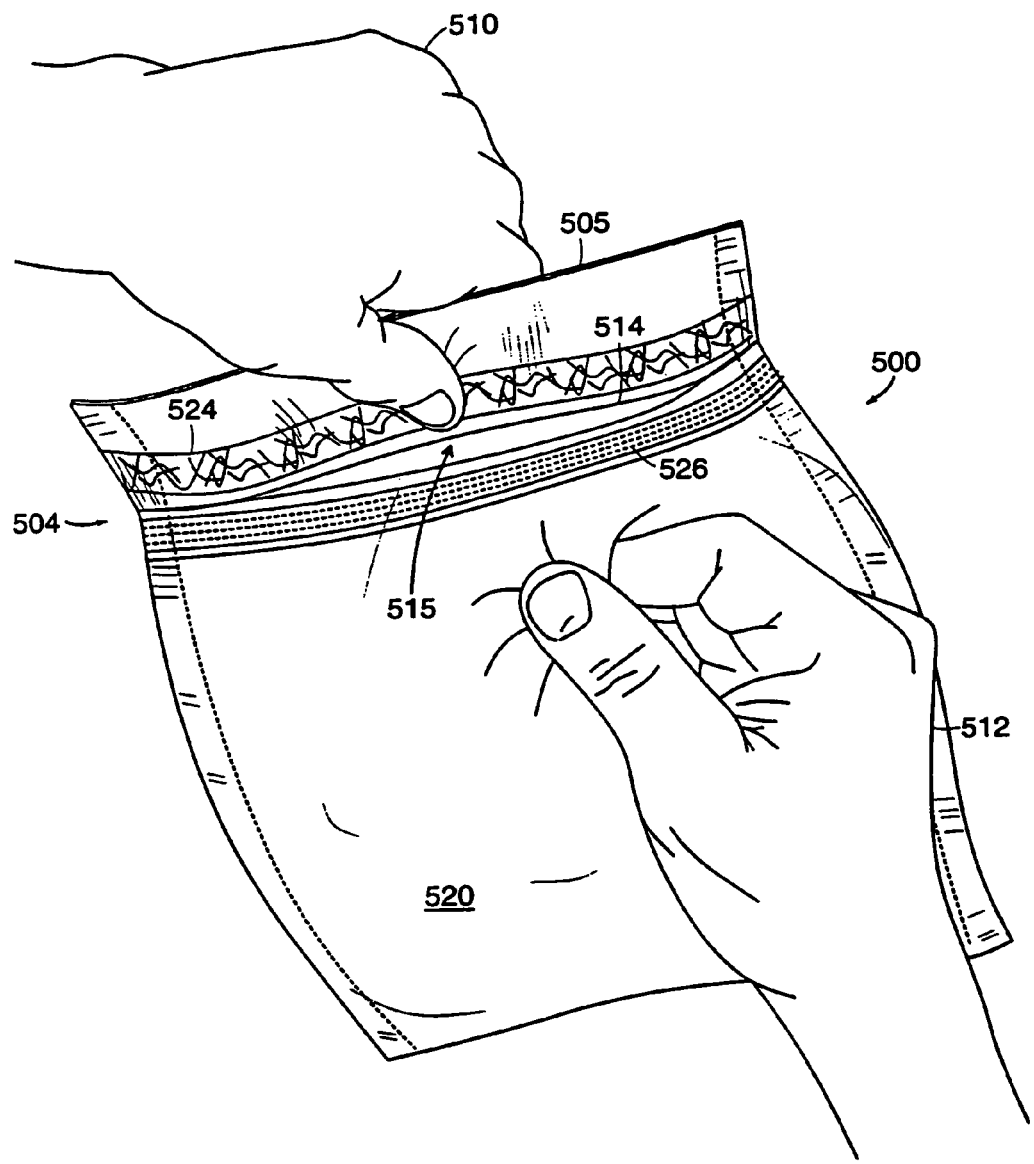
FIG. 40 illustrates the bag of FIG. 39 being opened by pinching and pulling.

Referring to FIG. 40, to initially open the sealed bag, the upper edge 502 is grasped in one hand 510 and the front face of the bag is grasped in the other hand 512, on either side of a frangible channel 514 extending along closure 504. By only grasping or pinching the front face of the bag with hand 512, and not the back face of the bag, pulling the front face of the bag away from the upper edge places a high tensile load across channel 514, propagating a tear along channel 514 that creates an opening 515 into the bag.

Figure 41A:
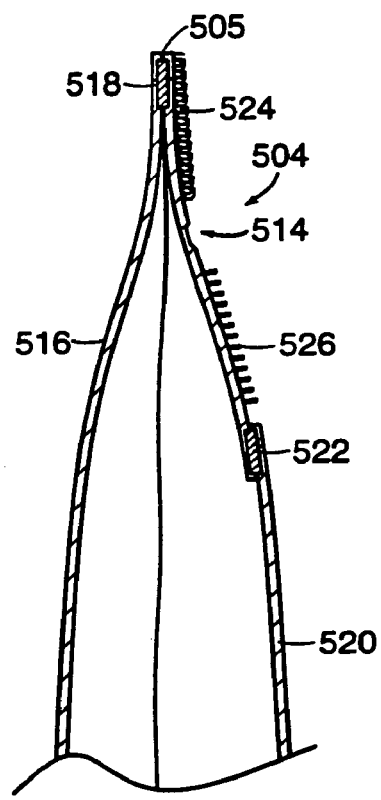
FIG. 41A is a cross-sectional view of the closure end of the bag, taken along line 41A-41A in FIG. 39.

As shown in FIG. 41A, the bag material of the back side 516 of the bag is welded to the back (i.e., non-fastening) side of the reclosable closure 504 at 518. The bag material of the front side 520 of the bag is welded to the closure along an edge region 522 of the front (i.e., fastening) side of the closure 504. With the closure so attached to the bag material, and sealed along the sides of the bag (see FIG. 39), the closure provides an airtight, liquid-tight seal at one end of the bag.

Figure 41B:
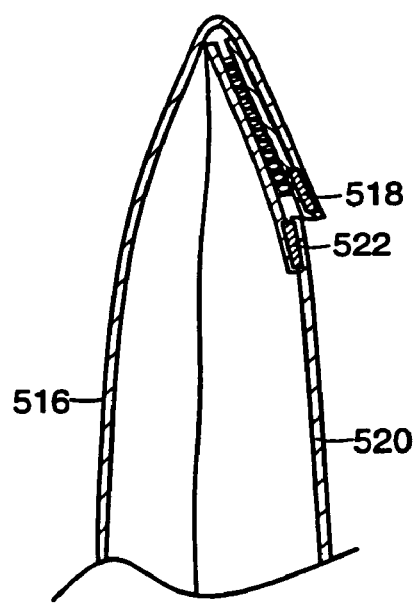
FIG. 41B shows the bag cross-section of FIG. 41A with the bag initially opened and then folded about the opening to engage the fastener elements of the closure.

The front face of closure 504 carries a strip 524 of fibrous loops, in non-woven form and partially embedded within the base resin of the closure, and a strip 526 of hook-shaped fastener elements molded out of resin of the base in rows extending along the length of the closure. After being initially opened by pulling apart the closure along groove 514, the bag may be reclosed by folding its upper edge about the opening created by tearing the closure, releasably engaging the strip 524 of loops with the strip 526 of hooks (FIG. 41B).

Figure 42:
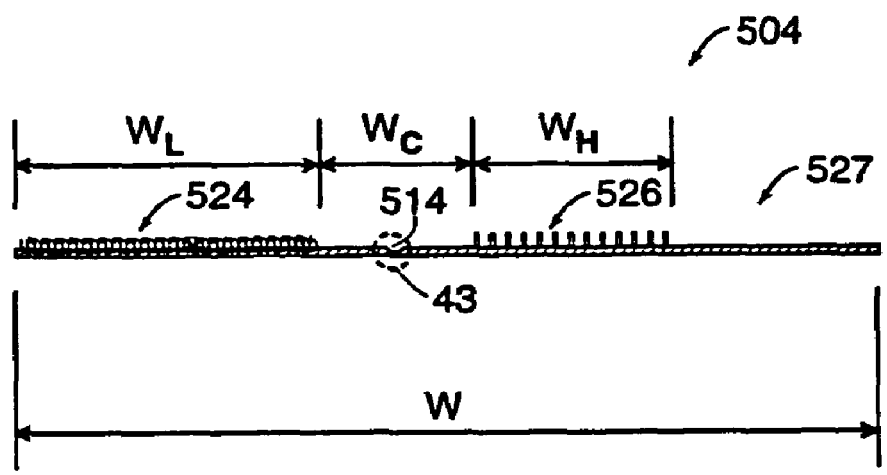
FIG. 42 illustrates the closure, in transverse cross-sectional view, before being attached to bag material.
Figure 43:
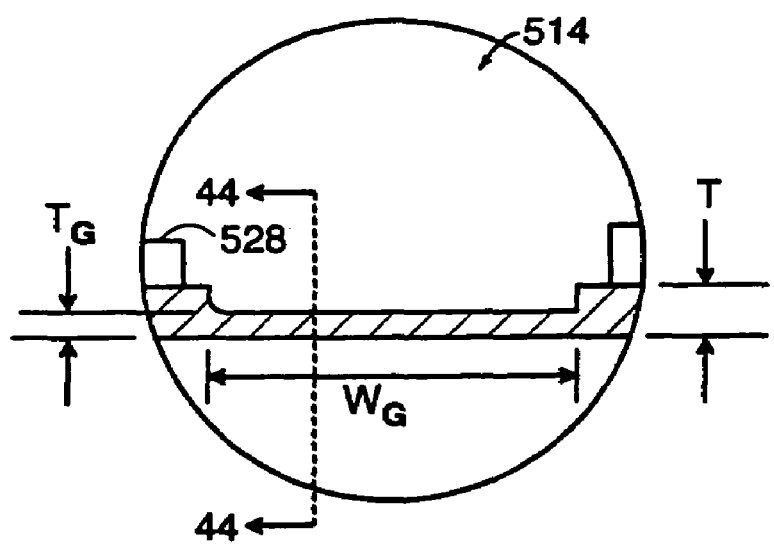
FIG. 43 is an enlarged view of area 43 in FIG. 42.

Referring to FIGS. 42 and 43, closure 504 is a strip of polyethylene having an overall width "W" of about 1.5 inches (38 millimeters) and a nominal thickness "T" of about 0.004 inch. Loop band 524 has a width $w_L$ of about 0.5 inch (12 millimeters), and hook band 526 a width $w_H$ of about 0.375 inch (9.5 millimeters). The hook and loop bands are separated by a distance $w_c$ of about 0.29 inch (7.4 millimeters), at the center of which is formed groove 514 that is 0.002 inch (0.05 millimeter) deep and extends over a width $w_G$ of about 0.036 inch (0.9 millimeter). Thus, at groove 514, the closure has a reduced thickness $T_G$ of only about 0.002 inch (0.05 millimeter). The remaining width of the closure strip forms an open weld flange 527 outboard of the band 526 of fastener elements for welding or otherwise attaching the closure strip to the bag material. Extending in many parallel rows on either side of groove 514 throughout the area of the closure separating the hook and loop bands is an array of rip-stop features 528 unitarily molded with the front face of the closure strip.

Figure 44:
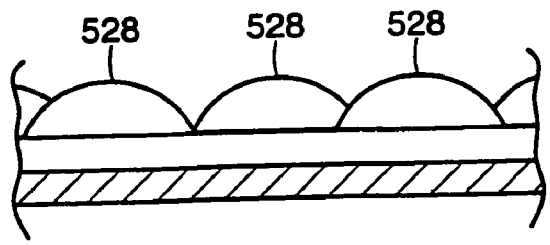
FIG. 44 is a cross-sectional view, taken along line 44-44 in FIG. 43.

As shown in FIG. 44, the rip-stop features 528 are hump-shaped protrusions that are longitudinally offset from the protrusions of adjacent rows to form a checkerboard matrix of bumps for limiting tear propagation from the tear channel. With a height of only about 0.006 inch (0.15 millimeter) from the face of the closure, the rip-stops 528 are substantially shorter than the engageable hook elements, such that the rip stops do not interfere with the engagement of the fastener elements or the folding of the bag after opening.

Figure 45:
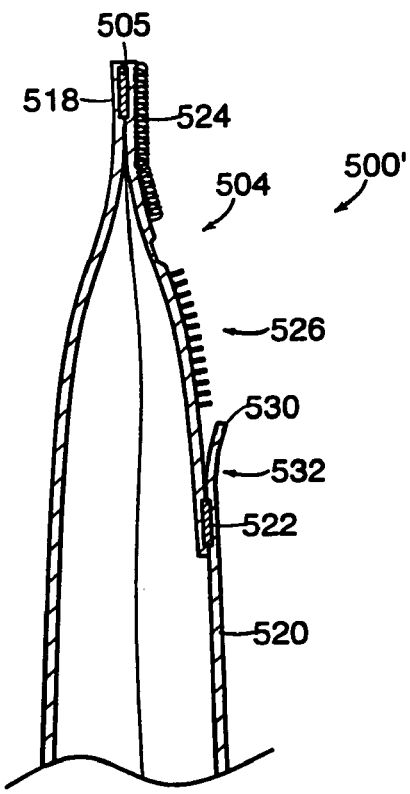
FIG. 45 is a cross-sectional view similar to FIG. 41A but of a bag having an edge pull tab along the lower closure edge.

Referring to FIG. 45, bag 500' is of construction similar in all aspects to that of above-described bag 500, except for the configuration of the attachment of the bag material of the front face 520 of the bag to the lower edge of closure strip 504. In this case, the weld zone 522 between the bag material and the closure strip is spaced apart from the free edge 530 of bag material 520, such that the distal edge of the bag material forms an exposed, cantilevered pull flap 532 extending along the entire width of the bag. Thus, to open bag 500' by bursting the closure strip along its tear groove, one hand grasps the upper edge 505 of the bag as with bag 500, but the other hand, rather than pinching the broad expanse of bag material forming the front face, grasps the convenient pull flap 532. The construction of bag 500' may be particularly advantageous where incidentally pinching the contents of the bag is to be avoided, for instance.

Figure 46:
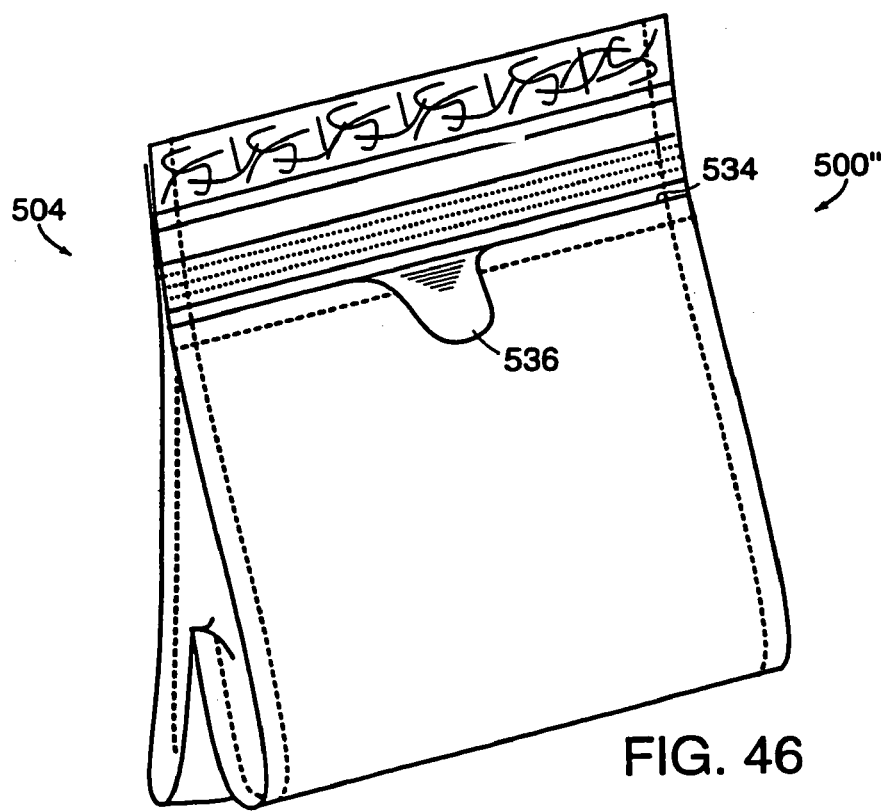
FIG. 46 is a perspective view of another bag, having a front face pull tab.

Another pull flap configuration is illustrated in FIG. 46. In this case, the upper edge 534 of the front face bag material is securely welded to the front face of closure 504, without leaving a graspable end exposed along its entire length, but the bag material is pre-cut to form an extending tab 536 of bag material at the center of the bag.

Figure 47:
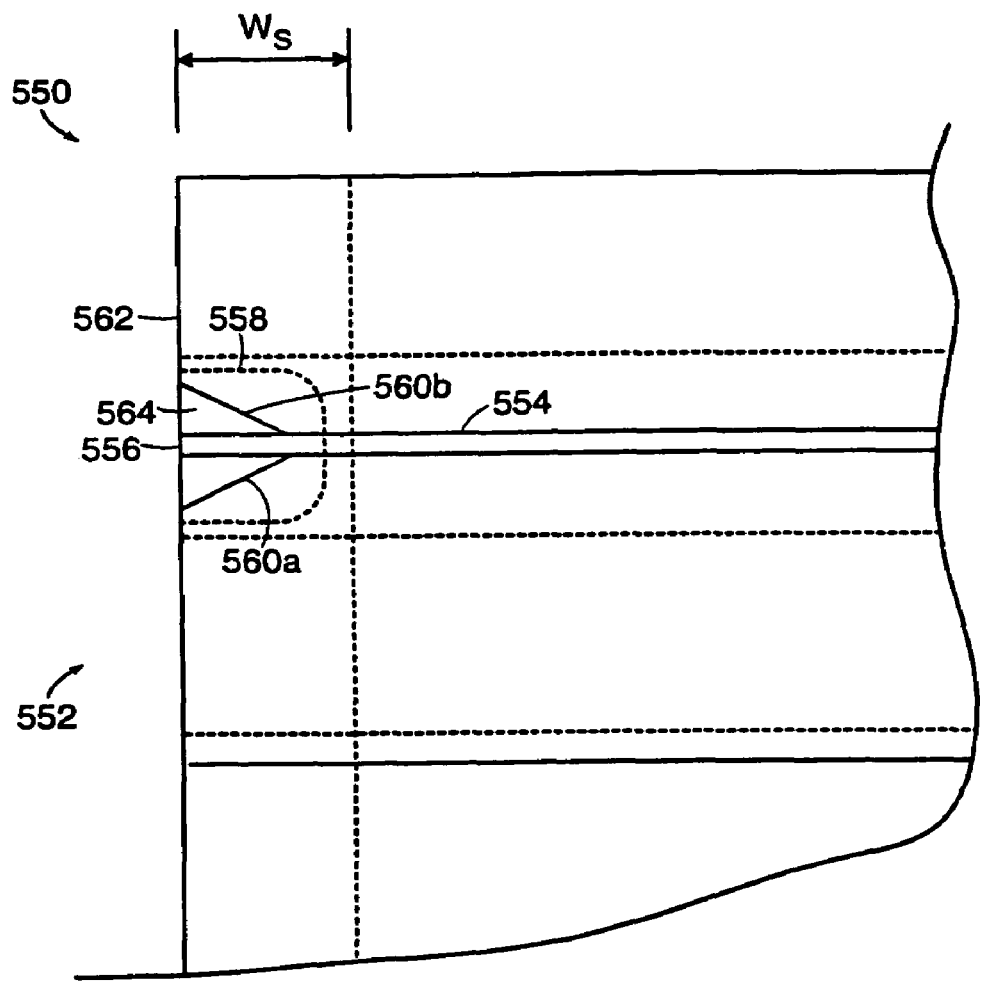
FIG. 47 shows a bag having a closure tear rib with a graspable end.

Referring to FIG. 47, bag 550 is of similar construction to the bags already described, except that its closure 552 has, in place of the frangible channel or groove, a tear rib 554 of substantially greater thickness than the base of the closure. Tear rib 554 extends along the closure midway between the loop and hook bands and is adapted to be grasped at one end 556 and pulled to separate the tear rib from the rest of the closure material along the width of the bag.

To enhance the graspability of the end 556 of tear rib 554, two features are formed in the bag and closure material adjacent the tear rib end, preferably by cutting methods. First, a notch 558 is formed in the bag material forming the back side of the bag, immediately behind tear rib end 556, big enough to enable the grasping of the tear rib end independent of the bag material but not extending through the entire width $w_s$ of the edge seal (if the integrity of the unopened bag seal is to be maintained). Second, two slits 560a and 560b are made through the base of closure 504 and extending at an angle from the bag edge 562 to, but not through, tear rib 554. The base of the closure between slits 560a and 560b thus forms a pull tab 564 with a wide distal end, free of any bag material, for improved graspability.

Figure 48:
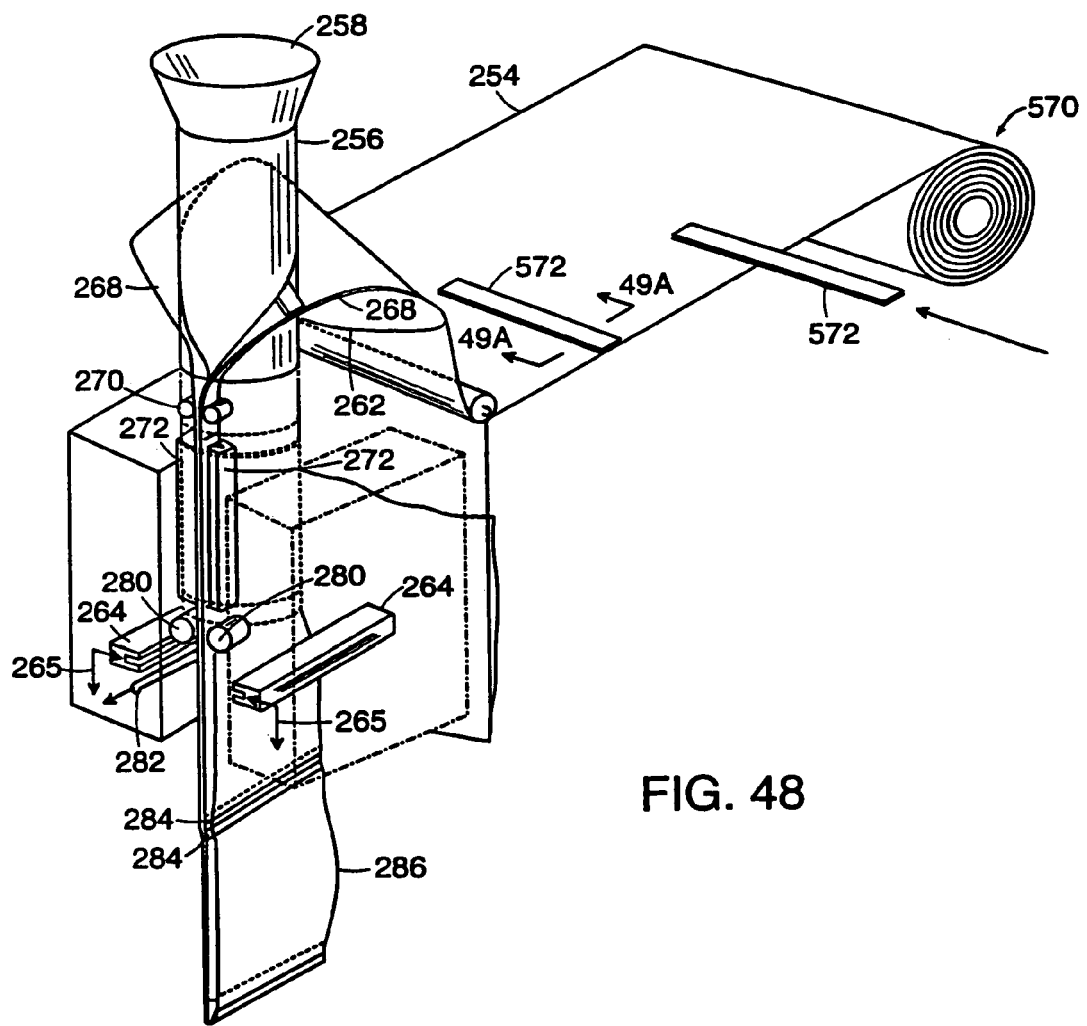
FIG. 48 illustrates a third vertical form/fill bagging apparatus and method, in which the closure strip is applied to the bag film before the film is wrapped about the forming head.

Referring to FIG. 48, another bag-making process features applying the closure strip in discrete lengths across the bag film (i.e., transversely), instead of longitudinally as earlier described. Bag film 254 is unspooled from a roll 570 and onto filling tube 256 over guide forms 262, as described above with respect to FIG. 15. However, in this case individual lengths 572 of closure strip are advanced across the bag film and permanently attached to the film, such as by thermal welding, at bag-length intervals. Preferably, the attachment of the closure strips occurs while the bag film is paused between film advancements, such as while a bag at the lower end of the tube is being sealed and severed. In this manner, inclusion of the closure strips requires very little modification in the bag-making apparatus. As an alternative to attaching the closure strips 572 to the bag film 254 as it is unrolled into the bag-making apparatus, roll 570 may be provided with the closure strips pre-applied at proper intervals.

Figure 49A:
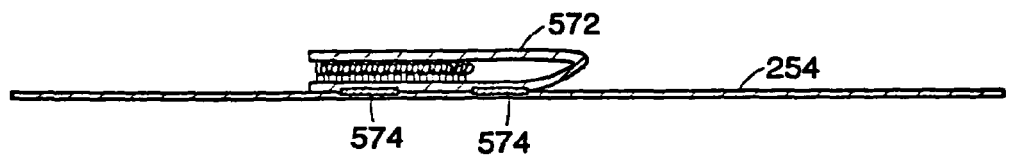
FIG. 49A is a cross-sectional view, taken along line 49A-49A in FIG. 48.

Referring also to FIG. 49A, the closure strip 572 is in one example folded over upon itself as attached to the bag film 254, with the bands of hooks and loops engaged to hold the closure in its folded condition. One side of the closure strip is welded to the bag film in areas 574, while the other side of the closure strip is left unattached until welded to an opposing surface of the bag film below the filling tube (e.g., by sealing bars 264). Thus, closure strip 572 is positioned at one end of the final bag, with its fold either directed outward or inward as desired. The sides of the bag may be joined to form the adjacent end edge of the bag to form an additional end seal. If necessary to hold the closure strip in its folded condition as the bag film is advanced onto the filling tube, the ends of the closure strip may be tacked together.

Figure 49B:
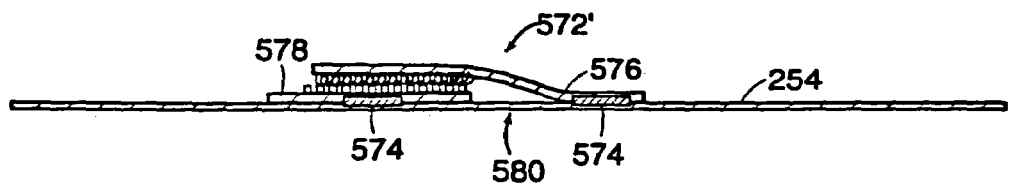
FIG. 49B is taken from the same perspective as FIG. 49A, with a different closure strip configuration.

An alternative closure strip configuration is shown in FIG. 49B. In this case, the closure strip 572' is supplied as two separate fastener strips—a loop strip 576 and a hook strip 578—that are engaged to each other along their length. Both fastener strips are permanently attached to bag film 254 along weld lines 574, on either side of a tear line 580 (e.g., a row of perforations or a continuous score) in bag film 254. Closure strip 572' may be positioned in the final bag at any point along the length of the bag, which is opened by bursting tear line 580 and separating the loop and hook bands of fastener strips 576 and 578. The bag is reclosed by pressing the hook and loop bands back together.

Figure 50A:
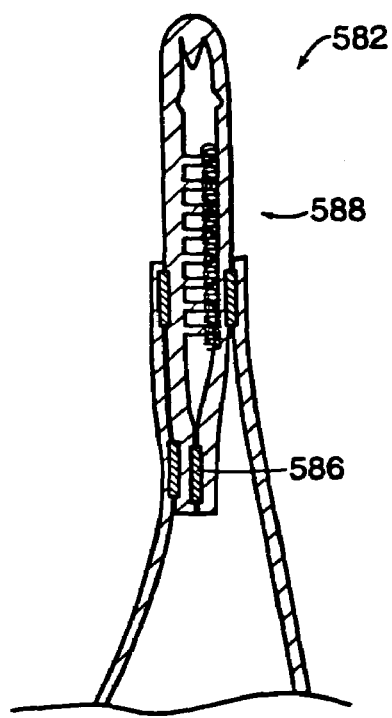
FIGS. 50A and 50B show closure strips with peelable seals.
Figure 50B:
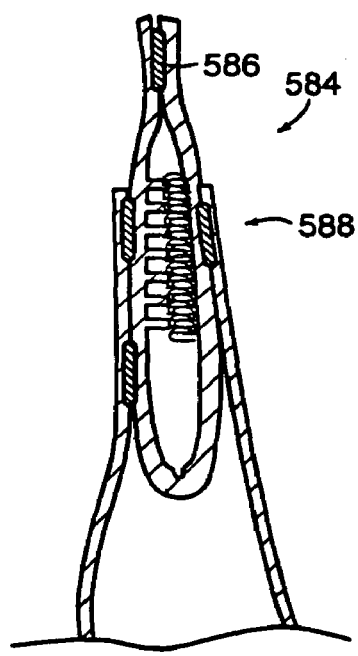

Referring to FIGS. 50A and 50B, closure strips 582 and 584 are advantageously provided with peelable seals 586 that act as secondary closure means. Peelable adhesives are well known in the industry, and provide an air and liquid tight seal that is relatively easy to open without tearing the underlying substrate. In some cases, seal 586 is of a material which becomes effectively non-tacky when initially opened. In other cases, seal 586 is of a material which retains its tackiness so as to continue to provide some sealing when the bag is reclosed. In closure strip 582 (FIG. 50A) the peelable seal 586 is located inboard of the primary hook and loop closure 588, so as to protect the loops and fastener elements from contamination from bag contents. In closure strip 582' (FIG. 50B) the peelable seal 586 is located outboard of the primary hook and loop closure 588 and must be opened to access the primary closure. The peel seal may be formed by applying a peelable adhesive, such as a pressure sensitive adhesive, to the front face of the closure strip. In some cases, the adhesive is applied in two discrete regions on the face of the strip, such that the adhesive of the two regions comes together to form the seal. Such peelable seals can provide a higher pantry life (i.e., a longer useful life after the bag has been initially opened) for the bag contents.

Figure 51:
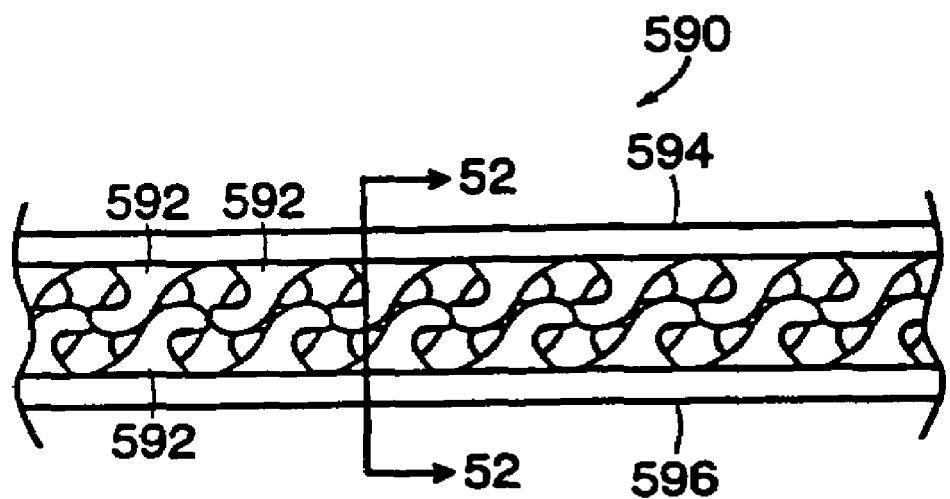
FIG. 51 shows a hook-to-hook engagement between facing bands of oppositely-directed, hook-shaped fastener elements.
Figure 52:
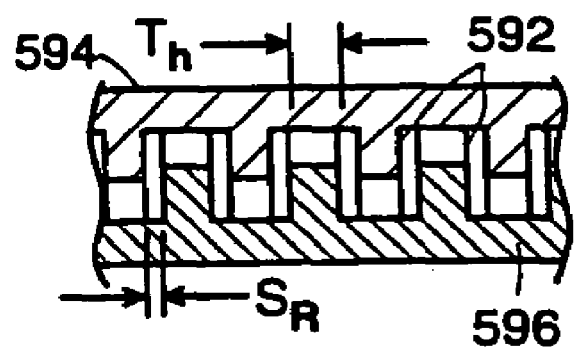
FIG. 52 is a cross-sectional view, taken along line 52-52 in FIG. 51.

Referring to FIG. 51, a closure strip 590 has mating bands of hook-shaped fastener elements 592. In one band, extending from one side 594 of the closure strip, the fastener elements all face to the left, while from the other side 596 of the closure strip the fastener elements all face to the right. As the bands of fastener elements 592 are pressed further together from the position shown, the tips of the hook-shaped fastener elements interlock to engage the two bands of elements. When pulled apart, the flexible tips extend to clear the tips of the other band of elements and then snap back to their original hook shape. This is one example of what is known in the closure industry as "self-engaging" fasteners—those in which the engaging fastener elements are of a similar structure. Other forms of self-engaging fastener elements include mushrooms, for example, such as the "DUAL-LOCK" fastener product marketed by Minnesota Mining and Manufacturing, Inc. With self-engaging hook-shaped fastening, we prefer to mold the hooks to have a greater thickness "$t_h$," than the spacing "$s_r$," between adjacent rows of elements (as shown in FIG. 52), such that the bands cannot be separated by moving one side of the closure strip laterally across the rows of fastener elements of the other side of the closure strip. The CFM-15 and CFM-29 hook shapes marketed by Velcro USA in Manchester, N.H., can be useful for self-engaging fasteners. The hook-shaped fastener elements should be spaced along their rows so as to provide sufficient clearance for the tips of a mating row of hooks to extend between adjacent hooks of the row. The optimal spacing will depend upon the selected hook shape and the strength of engagement desired. With mating arrays of mushroom-type fastener elements, the mushroom density of the opposing arrays should be different to avoid "dead-heading" the mushrooms (i.e., forcing the mushroom heads to deform rather than causing their stems to bend). One array may have, for example, a fastener element density on the order of about 50 to 200 fastener elements per square inch, while the density of fastener elements in the other array is of the order of about 500 to 2000. Optimal density matches will depend upon the desired engagement and disengagement loads, among other things. Self-engaging bands of fastener elements may be substituted for the loop and hook bands of any of the above-described closure strips to form self-engaging closures for various applications.

Preferably, whether hook and loop bands or self-engaging fastener bands are employed, the mating bands of the closure are advantageously configured to be engaged with a very low engagement force. We measure engagement force by measuring the facial load required between mating halves of a one-inch long length of closure strip to engage the closure. Disengagement peel force is measured as the load required to peel such a one-inch strip of closure apart. The closure can provide an advantageously low engagement force of, for instance, less than about one pound over a lineal inch of the closure, and a low disengagement peel force of less than about two pounds per lineal inch.

Materials other than polyethylene, such as polypropylene, polyester, nylon, and other thermoplastics and their co-polymers, may be employed. For example, laminated or co-extruded bag films can have inner surfaces of a material weld-compatible with the material of the closure base, and an outer surface of a material chosen for other properties, such as durability or impermeability.

As evident from the embodiments described above, these closure strips are useful in many packaging applications, for providing a readily-engaged releasable closure that does not require perfect alignment during closing. The closures are useful for packaged food items, such as cookies, candy bars, and even produce, and may be located at one sealed end or along a longitudinal seam of the package. By "bag", we mean to include all packages with flexible sides, including but not limited to standable pouches and flexible cartons.

Other bag and closure constructions and bag-forming methods to which the above features are applicable are disclosed in our U.S. Pat. No. 6,202,260 and our provisional U.S. patent applications 60/159,489, 60/228,819 and 60/231,377 (filed Oct. 14, 1999, Apr. 16, 1999 and Sep. 6, 2000, respectively), the entire disclosures of which are hereby incorporated by reference as if completely set forth.

The contents of the following applications are all incorporated herein by reference as if fully set forth: U.S. patent applications Ser. No. 09/293,257 filed Apr. 16, 1999 and WO US99/26261 filed Nov. 5, 1997, designating the United States among others.

A number of embodiments of the invention have been described. Nevertheless, it will be understood that various modifications may be made without departing from the spirit and scope of the invention. For example, it is to be noted that many features disclosed here are applicable to attaching the closure during bag making as well as to pre-applying the closure. Accordingly, other embodiments are within the scope of the following claims.

What is claimed is:

1. A method of fabricating reclosable bags, the method comprising:

disposing a releasably engaged closure between a first bag film portion and a second bag film portion, the closure comprising a loop-engageable fastener strip and a loop strip, the loop-engageable fastener strip comprising an array of loop-engageable fastener elements integrally molded with and extending from a sheet-form resin substrate, the loop strip comprising a plurality of loops carried on a sheet-form resin base, the loop-engageable fastener elements being engaged with the loops; and applying energy to a bonding region of the first bag film portion adjacent the loop-engageable fastener strip and to a bonding region of the second bag film portion adjacent the loop strip, the energy bonding the resin substrate of the loop-engageable fastener strip to the first bag film portion and bonding the resin base of the loop strip to the second bag film portion, wherein the engaged loop-engageable fastener elements and loops define insulating air pockets therebetween, the insulating air pockets substantially preventing the loop-engageable fastener strip from becoming permanently bonded to the loop strip when the energy is applied to the first and second bag film portions.

2. The method of claim 1, wherein the closure comprises a unitary closure.

3. The method of claim 2, wherein the loop-engageable fastener strip and the loop strip are integrally attached to one another.

4. The method of claim 2, wherein the closure defines a frangible region extending between the loop-engageable fastener strip and the loop strip.

5. The method of claim 1, wherein the loop-engageable fastener elements comprise stems having integrally molded head elements extending from distal portions of the stems, the head elements overhanging the resin substrate.

6. The method of claim 1, wherein the loop-engageable fastener elements comprise hooks.

7. The method of claim 1, wherein the loop-engageable fastener elements comprise mushroom-shaped fastener elements.

8. The method of claim 1, wherein the energy comprises one or more types of energy selected from the group consisting of heat, acoustic energy, and radio-frequency energy.

9. The method of claim 1, wherein the energy is applied substantially simultaneously to the bond regions of the first and second bag film portions.

10. The method of claim 1, further comprising applying pressure to the bond regions of the first and second bag film portions.

11. The method of claim 10, wherein applying pressure to the bond regions comprises pressing the bag film portions and the closure between heated jaws.

12. The method of claim 1, wherein the loops of the loop strip overlap the bond regions of the first and second bag film portions.

13. The method of claim 1, wherein the bond between the resin substrate of the loop-engageable fastener strip and the first bag film portion comprises a thermal bond, and the bond between the resin base of the loop strip and the second bag film portion comprises a thermal bond.

14. The method of claim 1, wherein the loop-engageable fastener elements comprise one or more materials and the loops comprise one or more materials, the one or more materials of the loop-engageable fastener elements being incompatible with the one or more materials of the loops such that, when the energy is applied, the loop-engageable fastener elements and the loops are substantially prevented from becoming bonded to one another.

15. The method of claim 1, wherein the loop-engageable fastener elements have a first melting temperature and the loops have a second melting temperature significantly different than the first melting temperature, such that, when the energy is applied to the bonding regions of the first and second bag film portions, the loop-engageable fastener elements and the loops are substantially prevented from becoming bonded to one another.

16. The method of claim 1, wherein the first and second bag film portions comprise portions of separate sheets of bag film.

17. The method of claim 1, wherein the loops are at least partially encapsulated by and secured by the resin base.

18. The method of claim 1, wherein the method is performed during vertical form and fill packaging.

19. The method of claim 1, wherein the method is performed during horizontal form and fill packaging.

20. The method of claim 1, wherein the method is performed during pouch making.

21. A method of fabricating reclosable bags, the method comprising:
    disposing a releasably engaged closure between a first bag film portion and a second bag film portion, the closure comprising a loop-engageable fastener strip and a loop strip,
    the loop-engageable fastener strip comprising an array of loop-engageable fastener elements integrally molded with and extending from a sheet-form resin substrate,
    the loop strip comprising a plurality of loops carried on a sheet-form resin base,
    the loop-engageable fastener elements being engaged with the loops; and
    applying energy to a bonding region of the first bag film portion adjacent the loop-engageable fastener strip and to a bonding region of the second bag film portion adjacent the loop strip, the energy bonding the resin substrate of the loop-engageable fastener strip to the first bag film portion and bonding the resin base of the loop strip to the second bag film portion,
    wherein the loop-engageable fastener elements comprise one or more materials and the loops comprise one or more materials that are incapable of bonding to the one or more materials of the loop-engageable fastener elements in response to the applied energy.

22. The method of claim 21, wherein the one or more materials of the loop-engageable fastener elements and the one or more materials of the loops are incompatible with one another.

23. The method of claim 21, wherein the one or more materials of the loop-engageable fastener elements have a significantly different melting temperature than the one or more materials of the loops.

24. The method of claim 21, wherein the loops comprise one or more materials and the resin base comprises one or more materials, the one or more materials of the loops being incapable of bonding to the one or more materials of the resin base in response to the applied energy.

25. The method of claim 21, wherein the loop-engageable fastener elements comprise one or more polyolefins.

26. The method of claim 21, wherein the loops comprise one or more polyesters.

* * * * *